(12) United States Patent
Kentley-Klay

(10) Patent No.: US 10,384,718 B1
(45) Date of Patent: Aug. 20, 2019

(54) VEHICLE PARKING ASSIST

(71) Applicant: Zoox, Inc., Menlo Park, CA (US)

(72) Inventor: Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 15/936,148

(22) Filed: Mar. 26, 2018

(51) Int. Cl.
*B62D 15/02* (2006.01)
*G06N 20/00* (2019.01)
*B60Q 9/00* (2006.01)
*G08G 1/16* (2006.01)

(52) U.S. Cl.
CPC ........... *B62D 15/028* (2013.01); *B60Q 9/004* (2013.01); *G06N 20/00* (2019.01); *G08G 1/168* (2013.01)

(58) Field of Classification Search
CPC .... B62D 15/028; G06N 20/00; G06N 99/005; B60Q 9/004; G08G 1/168
See application file for complete search history.

(56) References Cited

U.S. PATENT DOCUMENTS

| | | | |
|---|---|---|---|
| 9,612,123 B1 | 4/2017 | Levinson et al. | |
| 9,682,707 B1* | 6/2017 | Silver | B60W 30/16 |
| 9,701,239 B2 | 7/2017 | Kentley et al. | |
| 9,878,664 B2 | 1/2018 | Kentley-Klay et al. | |
| 2005/0035879 A1* | 2/2005 | Gotzig | B60Q 9/006 340/932.2 |
| 2008/0154499 A1* | 6/2008 | Tanaka | G01C 21/362 701/431 |
| 2012/0197492 A1* | 8/2012 | Schneider | B62D 15/028 701/41 |
| 2014/0236414 A1* | 8/2014 | Droz | G08G 1/161 701/28 |
| 2017/0096167 A1* | 4/2017 | Yoon | B60R 1/00 |

\* cited by examiner

*Primary Examiner* — Sisay Yacob
(74) *Attorney, Agent, or Firm* — Lee & Hayes, P.C.

(57) ABSTRACT

Vehicle parking assist is described. In an example, computing system(s) associated with a first vehicle can receive, from sensor(s) associated with the first vehicle, sensor data associated with a second vehicle. Additionally, the computing system(s) can receive an indication that a second vehicle is proximate the first vehicle and can determine, based at least partly on the sensor data, that the second vehicle is moving toward a location proximate the first vehicle (e.g., to park). Based at least partly on the sensor data, the computing system(s) associated with the first vehicle can determine a position, an orientation, and/or a velocity of the second vehicle and based at least partly on determining the position, the orientation, and/or the velocity, can determine instruction(s) for guiding the second vehicle, for example to park. The instruction(s) can be output via light emitter(s), sound emitter(s), and/or a remote user interface associated with the second vehicle.

20 Claims, 11 Drawing Sheets

VEHICLE PARKING ASSIST

BACKGROUND

Vehicles often have onboard parking assist systems, which assist drivers in parking their vehicles. For example, vehicles can include in-dash displays that provide guidance (e.g., via graphics and/or guidelines on the display) to drivers of the vehicles for parking (e.g., used in conjunction with review cameras).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
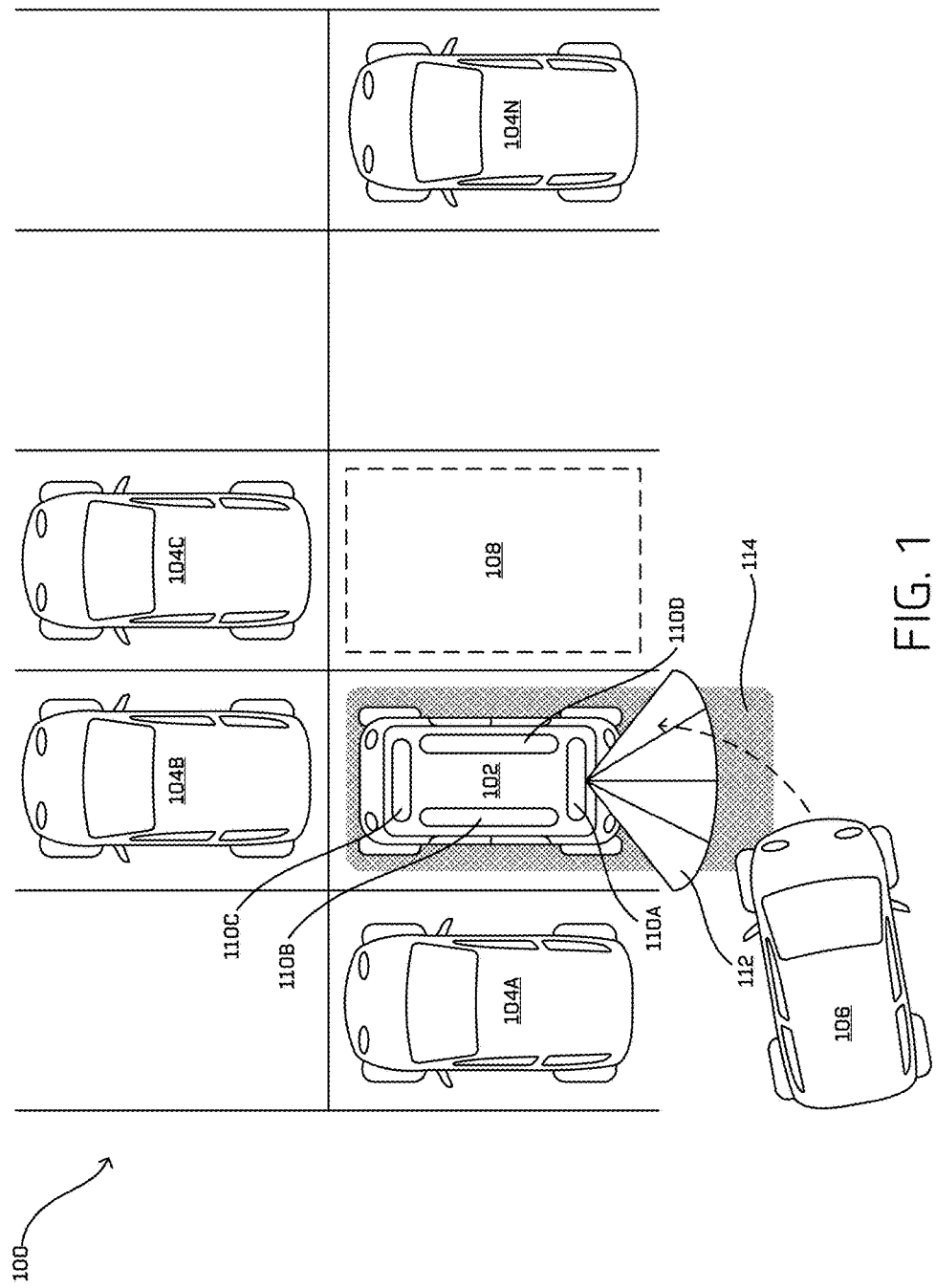
FIG. 1 is a schematic diagram illustrating a first example implementation of vehicle parking assist as described herein.

Techniques described herein are directed to parking assist for vehicles. In at least one example, techniques described herein are directed to leveraging various user interfaces associated with a vehicle to assist another vehicle (that is proximate the vehicle) with parking and/or otherwise moving proximate the vehicle. The various user interfaces can include light emitters, sound emitters, etc. Such user interfaces can emit light beams, sound beams, etc. to communicate one or more instructions to the other vehicle to assist the other vehicle with parking, for example. In an additional or alternative example, techniques described herein can transmit one or more instructions to a remote device associated with the other vehicle (e.g., a mobile device operated by a driver and/or passenger, a computing device associated with the other vehicle, etc.) to assist the other vehicle with parking.

In at least one example, a first vehicle can be associated with one or more sensors that can be disposed on the first vehicle. The one or more sensors can include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), etc. The one or more sensors can generate sensor data, which can be utilized by one or more computing systems associated with the first vehicle. The one or more computing systems can determine that a second vehicle is proximate the first vehicle based at least in part on the sensor data. That is, the one or more computing systems can determine that a second vehicle is within a threshold distance and/or space of the first vehicle. In at least one example, the one or more computing systems can leverage the sensor data and/or map data (e.g., associated with a map of an environment) to determine a parking location proximate the first vehicle. A parking location can correspond to a space for a vehicle to park. A parking location can be proximate the first vehicle if the parking location is within a threshold distance and/or space of the first vehicle. In some examples, parking spaces in a geographic area may be maintained in a map accessible by the first vehicle, or determined based on markings on the ground using the vehicle's sensors. Further, in at least one example, the one or more computing systems can determine that the second vehicle is moving toward the first vehicle and/or the parking location proximate the first vehicle.

In at least one example, responsive to determining that the second vehicle is moving toward the first vehicle and/or the parking location proximate the first vehicle, the first vehicle can generate one or more instructions for assisting the second vehicle with parking. That is, the first vehicle can generate one or more instructions that can be output via one or more user interfaces to navigate the second vehicle. In some examples, the one or more instructions can alert the second vehicle of its proximity to the first vehicle and/or guide the second vehicle away from the first vehicle (e.g., to avoid a collision). For instance, in at least one example, the one or more instructions can cause the output of a light and/or sound indication, or a direct communication, to alert the second vehicle that the second vehicle is going to collide with the first vehicle (e.g., based on determining that the second vehicle is within a threshold distance of a surface of the first vehicle). Additionally or alternatively, the one or more instructions can cause the output of a light and/or sound indication, or a direct communication, to guide the second vehicle in order to avoid a collision with the first vehicle. In additional or alternative examples, the one or more instructions can navigate the second vehicle into the parking location. That is, in some examples, the one or more instructions can cause the output of a light and/or sound indication, or a direct communication, to direct the second vehicle into the parking location.

The one or more instructions can be output via one or more user interfaces. As described above, in some examples, the one or more user interfaces can be associated with the first vehicle. In additional or alternative examples, the one or more user interfaces can be associated with the second vehicle (e.g., a mobile device of a driver and/or passenger of the second vehicle, a computing system associated with the second vehicle, etc.). The one or more user interfaces can emit light, sound, etc. For example, techniques described herein are directed to outputting one or more light beams via a light emitter to provide guidance to the second vehicle. That is, the first vehicle can output a visual indication associated with the one or more instructions so as to guide the second vehicle. For instance, the visual indication can be a flash of color, a gradual change of colors (e.g., green, yellow, red), a ruler, a guide, a line, etc. In some examples, the visual indication can be associated with text that can be associated with a semantic message (e.g., "STOP," "3 inches," "turn to the left," "backup," etc.). In at least one example, the visual indication can be projected onto a portion of the second vehicle and/or a surface proximate the second vehicle (e.g., the ground, a wall, an augmented reality display, etc.). Additionally and/or alternatively, the visual indication can be output via an electronic display (e.g., an electronic billboard, etc.) in at least one example. Furthermore, as described above, in some examples, techniques described herein are directed to outputting one or more acoustic beams via a sound emitter (e.g., a speaker, etc.). The one or more acoustic beams can be associated with a particular sound, a series of sounds (e.g., progressively louder instances of a sound, increased frequency of a sound, etc.), words (e.g., "STOP," "3 inches," "turn to the left," "backup," etc.), etc. Various combinations of light and sound can be imagined.

Additionally and/or alternatively, one or more computing systems associated with the first vehicle can transmit the one or more instructions to a remote device associated with the second vehicle. For instance, the one or more computing systems associated with the first vehicle can send the one or more instructions to a mobile device operated by a driver and/or passenger of the second vehicle. The mobile device can output the one or more instructions via a display associated with the mobile device (e.g., via an application downloaded by a user of the mobile device). Additionally and/or alternatively, the one or more computing systems associated with the first vehicle can send the one or more instructions to a computing system associated with the second vehicle (e.g., vehicle-to-vehicle communication, via a BLUETOOTH® connection, via a Wi-Fi connection, etc.). The computing system associated with the second vehicle can output the one or more instructions via a user interface associated with the second vehicle. For instance, the computing system associated with the second vehicle can output the one or more instructions via a light emitter and/or sound emitter associated with the second vehicle. Additionally and/or alternatively, the computing system associated with the second vehicle can output the one or more instructions via a display associated with the second vehicle.

In at least one example, two or more vehicles can output the one or more instructions collectively to guide a second vehicle. For example, one or more vehicles that are similar to the first vehicle can be proximate the first vehicle. For the purpose of this discussion, a vehicle can be similar to another vehicle if the vehicles share at least one characteristic (e.g., both vehicles are autonomous vehicles, both vehicles have similar output capabilities, etc.). The two or more vehicles can collectively output the one or more instructions via user interface(s) associated with the two or more vehicles. For example, each vehicle in the two or more vehicles can output a portion of an arrow for directing the second vehicle to a parking location. Additionally and/or alternatively, the two or more vehicles can provide audio instructions for guiding the second vehicle into a parking location. Furthermore, in at least one example, the first vehicle (alone or with one or more other similar vehicles), can provide a light indication and/or a sound indication, or a direct communication, to another similar vehicle to notify the other similar vehicle of a location of a parking location at a particular location.

FIGS. 1-5 below describe various examples of vehicle parking assist as described herein.

FIG. 1 is a schematic diagram illustrating a first example implementation of vehicle parking assist as described herein. FIG. 1 is associated with an environment 100 in which a vehicle 102 is positioned. The example vehicle 102 shown in FIG. 1 is an automobile having four wheels. Other types and configurations of vehicles are contemplated, such as, for example, vans, sport utility vehicles, cross-over vehicles, trucks, buses, agricultural vehicles, and construction vehicles. The vehicle 102 can be powered by one or more internal combustion engines, one or more electric motors, hydrogen power, any combination thereof, and/or any other suitable power sources. In at least one example, the vehicle 102 can be associated with one or more sensors which can be used to generate sensor data. The one or more sensors can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), etc.

For the purpose of illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In FIG. 1, the environment 100 corresponds to a parking lot, where one or more parked vehicles 104A-104N are parked in corresponding parking locations. In at least one example, the one or more sensors associated with the vehicle 102 can generate sensor data, which can be utilized by one or more computing systems associated with the vehicle 102. The one or more computing systems can determine that another vehicle 106 is proximate the vehicle 102 based at least in part on the sensor data. In at least one example, the one or more computing systems can leverage the sensor data to determine a parking location 108 proximate the vehicle 102. Additionally and/or alternatively, in at least one example, the one or more computing systems can utilize map data associated with a map to determine a parking location 108 proximate the vehicle 102. For the purpose of this discussion, a map can be any number of data structures modeled in two dimensions or three dimensions that are capable of providing information about an environment (e.g., environment 100), such as, but not limited to, topologies (such as intersections), streets, mountain ranges, roads, terrain, and the environment in general. In at least one example, the one or more computing systems can determine that the other vehicle 106 is moving toward the vehicle 102 and/or the parking location 108 proximate the vehicle 102. For instance, in an example, the one or more computing systems can determine that the other vehicle 106 is attempting to park based on the position, the orientation, and/or the velocity of the other vehicle 106 and/or other features of the environment 100 (e.g., an empty parking location 108 that is proximate the vehicle 102).

In at least one example, responsive to determining that the other vehicle 106 is moving toward the vehicle 102 and/or the parking location 108 proximate the vehicle 102, the one or more computing systems associated with the vehicle 102 can generate one or more instructions for assisting the other vehicle 106 with parking. That is, the one or more computing systems associated with the vehicle 102 can generate one or more instructions that can be output via one or more user interfaces to navigate the other vehicle 106. In some examples, the one or more instructions can assist in guiding the other vehicle 106 away from the vehicle 102 (e.g., to avoid a collision). In additional or alternative examples, the one or more instructions can assist in guiding the other vehicle 106 into the parking location 108. Additionally and/or alternatively, the vehicle 102 may receive a request from the other vehicle 106 (e.g., via a wireless data signal from the other vehicle 106, a mobile device of a driver of the other vehicle, etc.) to initiate parking assistance.

As described above, the one or more instructions can be output via one or more user interfaces. As described above, in some examples, the one or more user interfaces can be associated with the vehicle 102. In FIG. 1, the one or more user interfaces are illustrated as light emitters 110A-110D (collectively 110). While the vehicle 102 is illustrated with four light emitters 110, in additional or alternative examples, the vehicle 102 can be associated with any number of light emitters 110 (and/or sound emitters as described below with reference to FIG. 3). The light emitters can be disposed on one or more surfaces of the vehicle 102. In at least one example, a light emitter (e.g., 110A-110D) can include a processor that is configured to implement visual indications (e.g., which can be associated with the one or more instructions for guiding the other vehicle 106). As described herein, in some examples, the light emitter can be a projector and/or an electronic display (e.g., an electronic billboard, etc.). Additional details associated with light emitters are described in U.S. Pat. No. 9,701,239, entitled System of Configuring Active Lighting to Indicate Directionality of an Autonomous Vehicle, which is incorporated in its entirety by reference herein.

In at least one example, as illustrated in FIG. 1, at least one light emitter 110A can output one or more light beams 112 to provide guidance to the other vehicle 106. That is, the vehicle 102 can output a visual indication associated with the one or more instructions so as to assist with guiding the other vehicle 106. For instance, the visual indication can be a flash of color, a gradual change of colors (e.g., green, yellow, red), a ruler, a guide, a line, etc. As illustrated in FIG. 1, the one or more light beams 112 can correspond to a visual indication to assist with guiding the other vehicle 106 away from the vehicle 102 and/or into the parking location 108.

In at least one example, a region 114 can be associated with the vehicle 102. For instance, the region can correspond to a minimum intended distance between the vehicle 102 and another vehicle (e.g., the other vehicle 106). The minimum intended distance can be measured from any surface of the vehicle 102. In some examples, the region 114 can be dynamically determined. For example, one or more computing systems associated with the vehicle 102, as described below, can determine the region 114 based on weather conditions, surface traction, time of day, characteristic(s) of the other vehicle 106, etc. As a non-limiting example, the minimum intended distance can be greater in winter weather conditions or at nighttime than during summer weather conditions or during the daytime. Such a minimum intended distance may be calculated to ensure the safety of the vehicle 102. As a non-limiting example, a larger intended distance may be calculated in icy conditions to ensure that the other vehicle 106 does not slide into the vehicle 102.

In at least one example, the one or more computing systems can utilize the sensor data to determine the position and/or orientation of the other vehicle 106 relative to the vehicle 102. Responsive to the other vehicle 106 entering the region 114, the one or more computing systems can generate one or more instructions for guiding the other vehicle 106 and can output the one or more instructions for guiding the other vehicle 106, via the light emitter(s) 110. That is, responsive to determining that the other vehicle 106 enters the region 114, the light emitter(s) 110 can output the light beam(s) 112 to navigate the other vehicle 106 away from the vehicle 102 and/or into the parking location 108. In at least one example, responsive to determining that the other vehicle 106 enters the region 114, the light emitter(s) 110 can output the light beam(s) 112 to alert the other vehicle 106 that it is about to collide with the vehicle 102. In some examples, such an output can be based on a determination that the other vehicle enters the region 106 at a particular speed and/or direction of travel.

Figure 2:
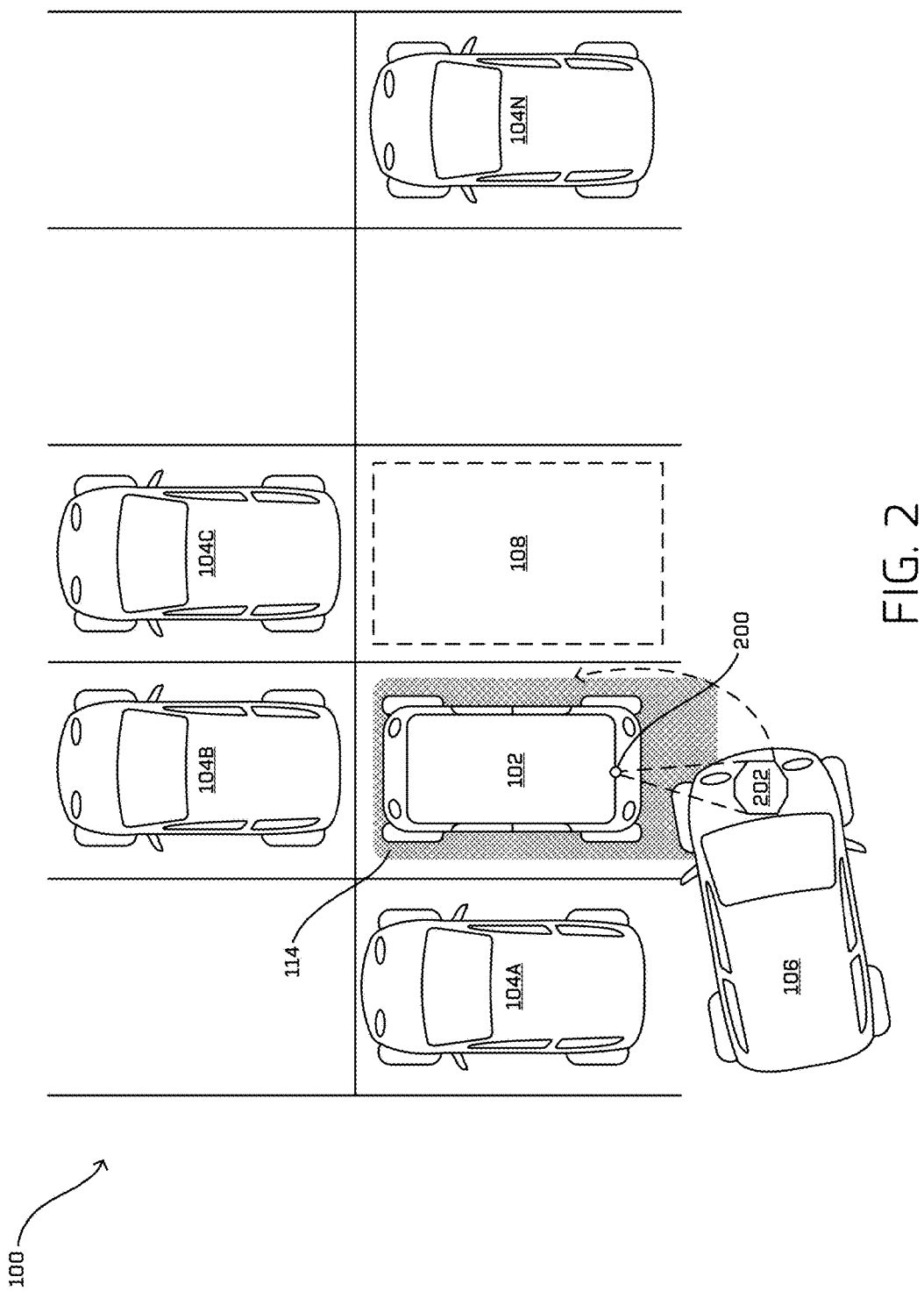
FIG. 2 is a schematic diagram illustrating a second example implementation of vehicle parking assist as described herein.

FIG. 2 is a schematic diagram illustrating a second example implementation of vehicle parking assist as described herein. FIG. 2 depicts the same (or similar) environment 100 as FIG. 1, described above. In at least one example, a light emitter can be a projector 200 configured to project one or more light beams on another surface such to project a visual indicator 202 on the other surface. For instance, the projector 200 can project the visual indicator 202 onto a portion of the other vehicle 106, as illustrated in FIG. 2. While the visual indicator 202 illustrated in FIG. 2 is a stop sign, the visual indicator 202 can be any visual indicator, as described above. In additional or alternative examples, the projector 200 can project the visual indicator 202 onto a surface proximate the vehicle 102 and/or the other vehicle 106. For instance, the projector can project the visual indicator onto the ground, a wall, an augmented reality display, or another surface. The projector 200 is illustrated as disposed at the front (or rear) of the vehicle 102. However, the projector 200 can be disposed on any surface of the vehicle 102 and, in some examples, the vehicle 102 can have more than one projector (or no projectors).

Figure 3:
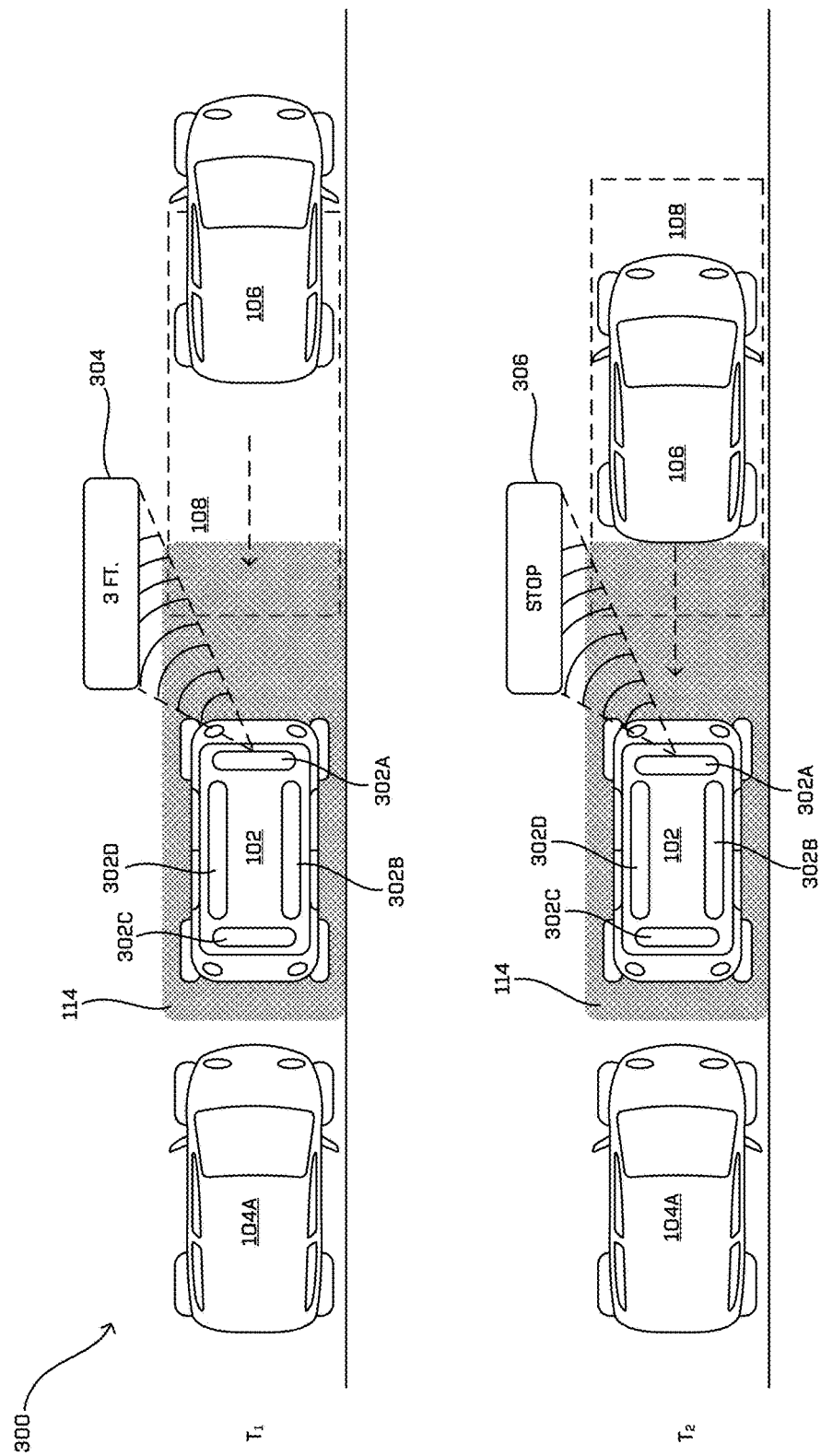
FIG. 3 is a schematic diagram illustrating a third example implementation of vehicle parking assist as described herein.

FIG. 3 is a schematic diagram illustrating a third example implementation of vehicle parking assist as described herein. In FIG. 3, the vehicle 102 is positioned in environment 300, which resembles a parallel parking situation. For the ease of illustration, the vehicles in FIG. 3 are numbered similarly to the vehicles illustrated in FIGS. 1 and 2. Accordingly, parked vehicle 104A is parked in a parking location proximate the vehicle 102 and the other vehicle 106 is parking in a parking location proximate the vehicle 102. Furthermore, as described above, sensor data received from the one or more sensors associated with the vehicle 102 and/or map data can be used to determine a parking location 108 proximate the vehicle 102.

FIG. 3 illustrates the other vehicle 106 parking, or otherwise moving toward the vehicle 102, at a first time ($T_1$) and a second time ($T_2$). As described above, in at least one example, the vehicle 102 can be associated with a region 114. As illustrated at the first time ($T_1$), the other vehicle 106 is moving toward the vehicle 102 but has not yet entered the region 114. As described above, in at least one example, responsive to determining that another vehicle 106 is moving toward the vehicle 102 and/or the parking location 108 (and/or otherwise receiving a signal indicative of a parking assist request), the one or more computing systems associated with the vehicle 102 can generate one or more instructions for assisting the other vehicle 106 with parking. That is, the one or more computing systems associated with the vehicle 102 can generate one or more instructions that can be output via one or more user interfaces to navigate the other vehicle 106. In some examples, the one or more instructions can assist in guiding the other vehicle 106 away from the vehicle 102 (e.g., to avoid a collision). In additional or alternative examples, the one or more instructions can assist in guiding the other vehicle 106 into the parking location 108. In at least one example, the one or more instructions can be used to alert the other vehicle 106 that it is going to collide with the vehicle 102.

As described above, the one or more instructions can be output via one or more user interfaces. As described above, in some examples, the one or more user interfaces can be associated with the vehicle 102. In FIG. 3, the one or more user interfaces are illustrated as sound emitters 302A-302D (collectively 302). While the vehicle 102 is illustrated with four sound emitters 302, in additional or alternative examples, the vehicle 102 can be associated with any number of sound emitters 302 (and/or light emitters, as illustrated and described above with reference to FIGS. 1 and 2). The sound emitters 302 can be disposed on one or more surfaces of the vehicle 102. In at least one example, a sound emitter (e.g., 302A-302D) can be a speaker configured to direct a respective beam of steered acoustic energy (e.g., an acoustic beam) outward into the environment 300 (e.g., which can be associated with the one or more instructions for guiding the other vehicle 106). Additional details associated with sound and/or light emitters are described in U.S. Pat. No. 9,701,239, entitled System of Configuring Active Lighting to Indicate Directionality of an Autonomous Vehicle, which is incorporated in its entirety by reference herein, as described above, and/or U.S. Pat. No. 9,878,664, entitled Method for Robotic Vehicle Communication with an External Environment via Acoustic Beam Forming, which is incorporated in its entirety by reference herein.

In at least one example, as illustrated in FIG. 3, at least one sound emitter 302A can output one or more acoustic beams 304 to provide guidance to the other vehicle 106. That is, the vehicle 102 can output an audible indication associated with the one or more instructions such to assist with guiding the other vehicle 106. For instance, the audible indication can be a particular sound, a series of sounds (e.g., progressively louder instances of a sound, increased frequency of a sound, etc.), words (e.g., "STOP," "3 inches," "turn to the left," "backup," etc.), etc. As illustrated in FIG. 3, the one or more sound beams 304 can correspond to an audible indication ("3 FT.") to assist with guiding the other vehicle 106 away from the vehicle 102 and/or into the parking location 108.

As described above, in at least one example, a region 114 can be associated with the vehicle 102. In at least one example, the one or more computing systems can utilize the sensor data to determine the position and/or orientation of the other vehicle 106 relative to the vehicle 102. At the second time ($T_2$), responsive to the other vehicle 106 entering the region 114, the one or more computing systems can generate one or more instructions for guiding the other vehicle 106 and can output the one or more instructions for guiding the other vehicle 106, via the sound emitter(s) 302. As illustrated in FIG. 3, the one or more instructions can be different than the instructions provided at the first time ($T_1$). That is, the one or more computing systems can track the position, the orientation, and/or the velocity of the other vehicle 106 and, responsive to determining that the other vehicle 106 enters the region 114, the sound emitter(s) 302 can output the sound beam(s) 306 to navigate the other vehicle 106 away from the vehicle 102 and/or into the parking location 108. As illustrated in FIG. 3, at the second time ($T_2$) the one or more sound beams 306 can correspond to an audible indication ("STOP") to assist with guiding the other vehicle 106 away from the vehicle 102 and/or into the parking location 108. That is, responsive to determining that the other vehicle 106 enters the region 114, the sound emitter(s) 302 can output the sound beam(s) 306 to alert the other vehicle 106 that it is about to collide with the vehicle 102. In some examples, such an output can be based on a determination that the other vehicle enters the region 106 at a particular speed and/or direction of travel.

Figure 4:
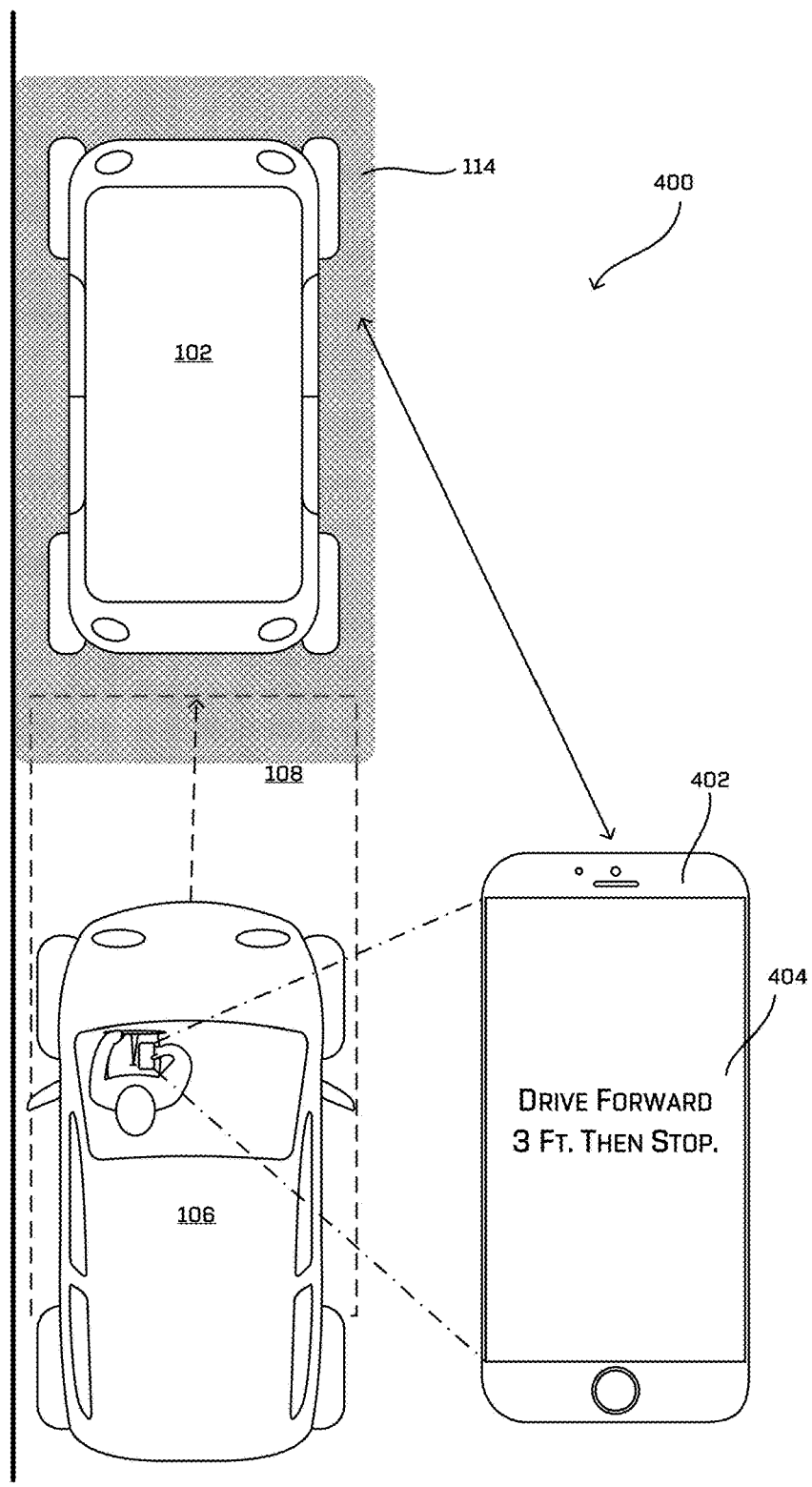
FIG. 4 is a schematic diagram illustrating a fourth example implementation of vehicle parking assist as described herein.

FIG. 4 is a schematic diagram illustrating a fourth example implementation of vehicle parking assist as described herein. FIG. 4 illustrates another environment 400, which corresponds to another parallel parking situation. As illustrated in FIG. 4, the vehicle 102 is parked and the other vehicle 106 is moving toward the vehicle 102 and/or the parking location 108. As described above, in at least one example, the one or more computing systems associated with the vehicle 102 can transmit one or more instructions to a remote device associated with the other vehicle 106. The remote device can be a mobile device 402 operated by a driver and/or passenger of the other vehicle 106, as illustrated in FIG. 4, a computing device associated with the other vehicle 106, etc. The one or more instructions can assist the other vehicle 106 with parking (or otherwise moving in environment 400). In at least one example, the remote device can output the one or more instructions via a user interface associated with the remote device. For example, in FIG. 4, the mobile device 402 can output the one or more instructions via a display 404 associated with the mobile device 402. In such an example, the mobile device 402 can execute a downloadable application which, once downloaded, can receive the one or more instructions and cause the one or more instructions to be output via the display 404 (or another user interface). In an additional or alternative example, the remote device can output the one or more instructions via a light emitter associated with the other vehicle 106, a sound emitter associated with the other vehicle, etc. In one or more examples, sensor data from the mobile device 402 (e.g., image data from a camera on mobile device 402) may be transmitted to the vehicle 102 to provide additional data for determining parking assistance instructions. In one such example, image data from a camera on the mobile device 402 may be used to create an augmented reality representation of a steering wheel in the other vehicle 106, indicating to the driver how to steer when parking.

Figure 5:
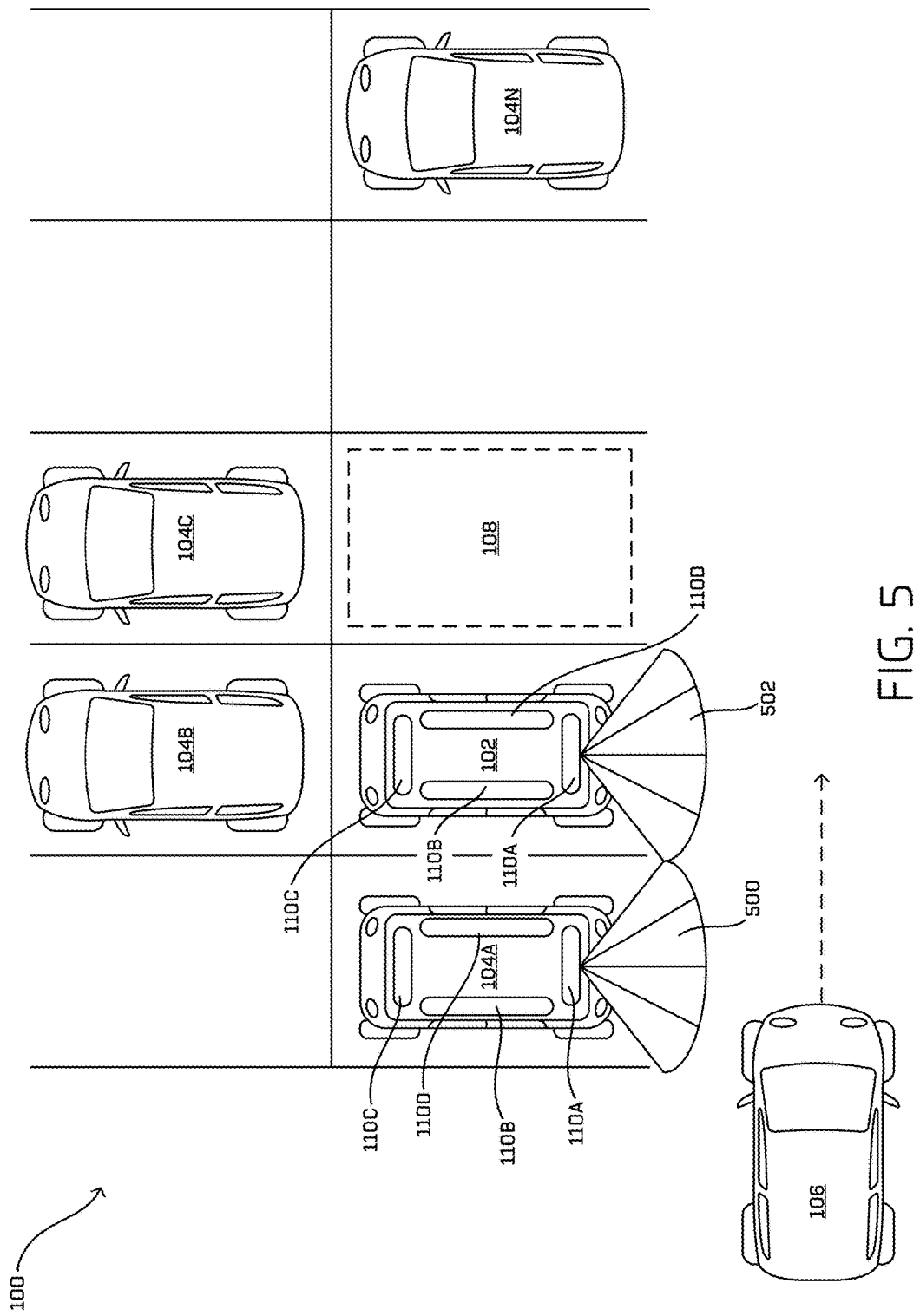
FIG. 5 is a schematic diagram illustrating a fifth example implementation of vehicle parking assist as described herein.

FIG. 5 is a schematic diagram illustrating a fifth example implementation of vehicle parking assist as described herein. In FIG. 5, the vehicle 102 is positioned in environment 100, which resembles a parking lot. For the ease of illustration, the vehicles in FIG. 5 are numbered similarly to the vehicles illustrated in FIGS. 1 and 2. Accordingly, parked vehicle 104A is parked in a parking location proximate the vehicle 102 and the other vehicle 106 is parking in a parking location proximate the vehicle 102. Furthermore, as described above, the one or more computing systems can utilize sensor data received from the one or more sensors associated with the vehicle 102 and/or map data to determine a parking location 108 proximate the vehicle 102.

As described above, in at least one example, two or more vehicles can output the one or more instructions to assist another vehicle with navigating to a parking location proximate the vehicle 102. For example, one or more vehicles that are similar to the vehicle 102 can be proximate the vehicle 102. As illustrated in FIG. 5, parked vehicle 104A can be similar to the vehicle 102. That is, the parked vehicle 104A can be an autonomous vehicle capable of communicating with the vehicle 102 (e.g., via vehicle-to-vehicle communication, BLUETOOTH®, Wi-Fi, etc.). As illustrated, the parked vehicle 104A can include one or more light (and/or sound) emitters, as described above with reference to the vehicle 102. While FIG. 5 illustrates two similar vehicles proximately located, any number of similar vehicles can be proximately located.

The two or more vehicles (e.g., the vehicle 102, the parked vehicle 104A) can collectively output the one or more instructions via user interface(s) associated with the two or more vehicles. For example, each vehicle in the two or more vehicles can output light beam(s) 500 and 502 that correspond to a portion of a visual indicator for directing the other vehicle 106 to a parking location. Or, the two or more vehicles can provide audio instructions for guiding the other vehicle 106 into a parking location.

FIGS. 1-5 illustrate five examples of vehicle parking assist as described herein. Of course, additional or alternative examples can be imagined. That is, any variation of visual and/or audible indications can be output via respective user interfaces to assist a vehicle moving toward another vehicle and/or a parking location proximate the other vehicle.

Figure 6:
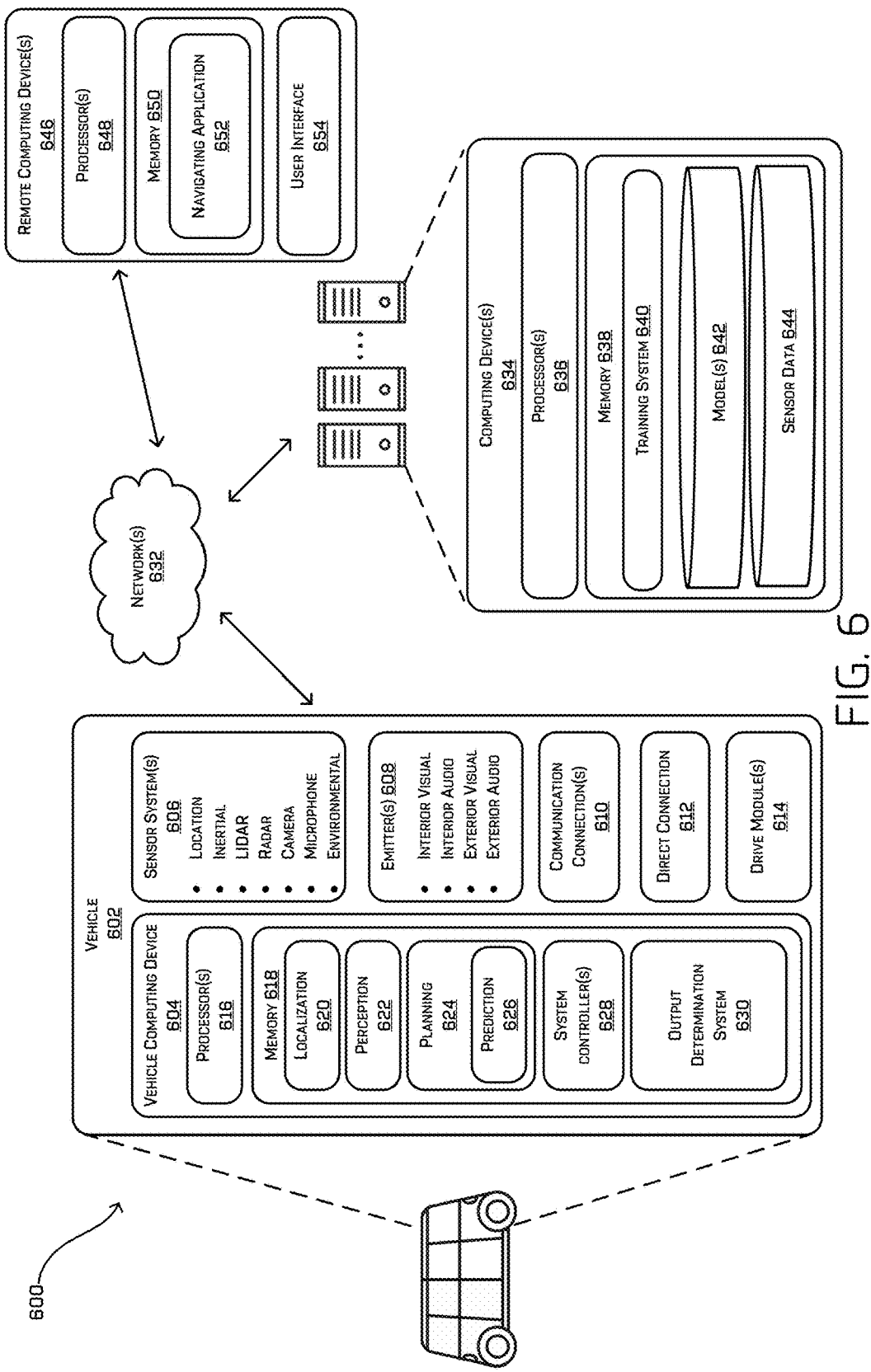
FIG. 6 is a block diagram illustrating an example system for facilitating vehicle parking assist as described herein.

FIG. 6 is a block diagram illustrating an example system for facilitating vehicle parking assist as described herein. In at least one example, the system 600 can include a vehicle 602, which can be the same vehicle as the vehicle 102 described above with reference to FIGS. 1-5.

The vehicle 602 can include a vehicle computing device 604, one or more sensor systems 606, one or more emitters 608, one or more communication connections 610, at least one direct connection 612, and one or more drive modules 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 604 stores a localization system 620, a perception system 622, a planning system 624, which can include a prediction system 626, one or more system controllers 628, and an output determination system 630.

In at least one example, the localization system 620 can determine where the vehicle 602 is in relation to a local and/or global map based at least in part on sensor data received from the sensor system(s) 606 and/or map data associated with a map. As described above, a map can be any number of data structures modeled in two dimensions or three dimensions that are capable of providing information about an environment, such as, but not limited to, topologies (such as intersections), streets, mountain ranges, roads, terrain, and the environment in general.

In at least one example, the perception system 622 can perform entity detection, segmentation, and/or classification based at least in part on sensor data received from the sensor system(s) 606. For instance, in at least one example, the perception system 622 can identify other entities, such as another vehicle, in the environment within which the vehicle 602 is positioned. Furthermore, the perception system 622 can track one or more of a position, an orientation, or a velocity of other entities in the environment. Additionally and/or alternatively, in at least one example, the perception system 622 can determine, based at least in part on sensor data, a parking location proximate the vehicle 602. In some examples, the perception system 622 can utilize machine vision to determine a parking location proximate to the vehicle 602, and in some instances, the parking location can be stored in connection with a map of the environment. In at least one example, the perception system 622 can determine extents (e.g., width and length) of the parking location and/or a vehicle that may be attempting to park in the parking location.

In at least one example, the planning system 624 can determine routes and/or trajectories to use to control the vehicle 602 based at least in part on sensor data received from the sensor system(s) 606. In at least one example, the planning system 624 can include a prediction system 626 that can predict the behavior of other entities in the environment within which the vehicle 602 is positioned based at least in part on sensor data received from the sensor system(s) 606. In at least one example, the prediction system 626 can determine that another vehicle in the environment within which the vehicle 602 is positioned is moving toward the vehicle 602 and/or a parking location proximate the vehicle 602. In at least one example, the planning system 624 can utilize machine trained model(s) as described below for determining that another vehicle proximate the vehicle 602 is exhibiting a parking behavior (e.g., parking).

Additional details of localizer systems, perception systems, planning systems, and/or prediction systems that are usable can be found in U.S. patent application Ser. No. 14/932,963, filed Nov. 4, 2016, entitled "Adaptive Mapping to Navigate Autonomous Vehicle Responsive to Physical Environment Changes," and Ser. No. 15/632,208, filed Jun. 23, 2017, entitled "Trajectory Generation and Execution Architecture," both of which are incorporated herein by reference. In an example where the vehicle 602 is not an autonomous vehicle, one or more of the aforementioned systems components can be omitted from the vehicle 602.

In at least one example, the localization system 620, the perception system 622, the planning system 624, and/or the prediction system 626 can process sensor data, as described above, and can send their respective outputs over one or more network(s) 632, to one or more computing device(s) 634. In at least one example, the localization system 620, the perception system 622, the planning system 624, and/or the prediction system 626 can send their respective outputs to the one or more computing device(s) 634 at a particular frequency, after a lapse of a predetermined period of time, in near real-time, responsive to determining that another vehicle is moving toward the vehicle 602, etc.

In at least one example, the vehicle computing device 604 can include one or more system controllers 628, which can be configured to control steering, propulsion, braking, safety, emitters, communication, and other systems of the vehicle 602. These system controller(s) 628 can communicate with and/or control corresponding systems of the drive module(s) 614 and/or other components of the vehicle 602.

In at least one example, the vehicle computing device 604 can enter a low-power mode when one or more systems of the vehicle 602 determine that the vehicle 602 is parked (e.g., based on a position, an orientation, and/or a velocity of the vehicle 602). That is, the one or more system controllers 628 can receive an indication from another system of the vehicle computing device 604 that the vehicle 602 is parked and, the one or more system controllers 628 can send one or more instructions to other components of the vehicle 602 to enter a low-power mode. In at least one example, the one or more system controllers 628 can enter a low-power mode by turning off one or more sensor systems 606 for a predetermined period of time. Utilizing a timer, the one or more system controllers 628 can determine that the predetermined period of time lapsed and can turn on one or more sensor systems 606 to determine whether any vehicles are proximate the vehicle 602. In some examples, at least a portion of data from sensor system(s) 606 may be used to determine motion in the environment around vehicle 602 while in a low-power state (e.g., receiving a RADAR and/or SONAR signal having defined distance and/or velocity values). Responsive to determining that another vehicle is proximate the vehicle 602 (and/or receiving a signal requesting parking assistance), the one or more system controllers 628 can send one or more instructions to activate other systems of the vehicle 602 to perform the processing discussed herein.

As described above, the memory 618 can include an output determination system 630. The output determination system 630 can determine when to output an indication for providing instructions via a user interface. In at least one example, the output determination system 630 can determine to output an indication responsive to receiving a request from another vehicle (e.g., via a wireless data signal from the other vehicle, a mobile device of a driver of the other vehicle, etc.) to initiate parking assistance. In at least one example, the output determination system 630 can receive perception data (e.g., data output via the perception system 622) to determine a position, an orientation, and/or a velocity of another vehicle proximate the vehicle 602. In at least one example, the output determination system 630 can generate, based at least in part on the position, the orientation, and/or the velocity of the other vehicle, one or more instructions that are to be output via a user interface for guiding the other vehicle (e.g., away from the vehicle 602 and/or into a parking location). In some examples, the output determination system 630 can receive updated perception data (e.g., in near-real time) and can update the one or more instructions based at least in part on the updated perception data. That is, the output determination system 630 can track the position, the orientation, and/or the velocity of the other vehicle and can update the one or more instructions based on changes to the position, the orientation, and/or the velocity of the other vehicle.

In additional or alternative examples, the output determination system 630 can receive perception data indicating that another vehicle is proximate the vehicle 602 and/or guiding to a parking location proximate the vehicle 602. Responsive to receiving such an indication, the output determination system 630 can generate one or more instructions for guiding the other vehicle. That is, responsive to receiving such an indication, the output determination system 630 can output the one or more instructions for guiding the other vehicle. As described above, in some examples, the output determination system 630 can receive updated perception data (e.g., in near-real time) and can update the one or more instructions based at least in part on the updated perception data. That is, the output determination system 630 can track the position, the orientation, and/or the velocity of the other vehicle and can update the one or more instructions based on changes to the position, the orientation, and/or the velocity of the other vehicle.

Additionally and/or alternatively, the output determination system 630 can determine a region around the vehicle 602, as described above with reference to FIGS. 1-5. In at least one example, the region can correspond to a minimum intended distance between the vehicle 602 and another vehicle. The minimum intended distance can be measured from any surface of the vehicle 602. In some examples, the region can be dynamically determined. For example, the output determination system 630 can determine the region based on weather conditions, surface traction, time of day, characteristic(s) of another vehicle, etc. In at least one example, the output determination system 630 can utilize the perception data to determine the position, the orientation, and/or the velocity of the other vehicle relative to the vehicle 602. Responsive to the other vehicle entering the region, the output determination system 630 can generate one or more instructions for guiding the other vehicle and can output the one or more instructions for guiding the other vehicle. In at least one example, responsive to the other vehicle entering the region, the output determination system 630 can generate one or more instructions for alerting the other vehicle (e.g., that it is going to collide with the vehicle 602).

As described above, in some examples, the output determination system 630 can receive updated perception data (e.g., in near-real time) and can update the one or more instructions based at least in part on the updated perception data. That is, the output determination system 630 can track the position, orientation, and/or velocity of the other vehicle and can update the one or more instructions based on changes to the position, the orientation, and/or the velocity of the other vehicle.

As described above, the one or more instructions for guiding another vehicle can be associated with a visual indication, an audible indication, a combination of visual indication(s) and/or audible indication(s), etc. For instance, the visual indication can be associated with one or more light beams that are output via a light emitter, as described herein. As described above, in at least one example, a light emitter can be a projector and/or an electronic display (e.g., an electronic billboard, etc.). Examples of the one or more instructions being output via a light emitter is described above with reference to FIGS. 1 and 2. In some examples, the audible indication can be associated with an acoustic beam that is output via a sound emitter, described below. An example of the one or more instructions being output via a sound emitter is described above with reference to FIG. 3. Furthermore, in at least one example, the one or more instructions can be transmitted to a remote device associated with the other vehicle. An example of the one or more instructions being transmitted to a remote device associated with another vehicle is described above with reference to FIG. 4. As described above, the remote device can be a mobile device operated by a driver and/or passenger of another vehicle and a downloadable application executing on the mobile device can cause the one or more instructions to be output via a display associated with the mobile device. Additionally and/or alternatively, the remote device can be associated with a computing system of the other vehicle, as described above.

In some examples, the output determination system 630 can determine that another similar vehicle is proximate the vehicle 602 (e.g., another autonomous vehicle) and the output determination system 630 can generate one or more instructions for guiding the other vehicle that can be output by the vehicle 602 and the other similar vehicle at a same and/or similar time (e.g., via a composite indication). In such an example, the output determination system 630 can transmit the one or more instructions (or at least a portion thereof) to a computing system associated with the other similar vehicle(s). Such an example is described above with reference to FIG. 5. Furthermore, in at least one example, the first vehicle (alone or with one or more other similar vehicles), can provide a light indication and/or a sound indication, or a direct communication, to another similar vehicle to notify the other similar vehicle of a location of a parking location at a particular location.

In at least one example, the sensor system(s) 606 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the LIDAR sensors can include individual LIDAR sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally and/or alternatively, the sensor system(s) 606 can send sensor data, via the one or more networks 632, to the one or more computing device(s) 634 at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include light emitters (e.g., indicator lights, signs, light arrays, projectors, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitters can be disposed at various locations about the exterior and/or interior of the vehicle 602. Additional details associated with the emitters 608 are described above with reference to FIGS. 1-5.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive module(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 632. For example, the communications connection(s) 610 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, the vehicle 602 can include one or more drive modules 614. In some examples, the vehicle 602 can have a single drive module 614. In at least one example, if the vehicle 602 has multiple drive modules 614, individual drive modules 614 can be positioned on opposite ends of the vehicle 602 (e.g., the front and the rear, etc.). In at least one example, the drive module(s) 614 can include one or more sensor systems to detect conditions of the drive module(s) 614 and/or the surroundings of the vehicle 602. By way of example and not limitation, the sensor system(s) can include one or more wheel encoders (e.g., rotary encoders) to sense rotation of the wheels of the drive module, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 614. In some cases, the sensor system(s) on the drive module(s) 614 can overlap or supplement corresponding systems of the vehicle 602 (e.g., sensor system(s) 606).

The drive module(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 614. Furthermore, the drive module(s) 614 also include one or more communication connection(s) that enable communication by the respective drive module with one or more other local or remote computing device(s).

As described above, the vehicle 602 can send sensor data to one or more computing device(s) 634, via the network(s) 632. In some examples, the vehicle 602 can send raw sensor data to the computing device(s) 634. In other examples, the vehicle 602 can send processed sensor data and/or representations of sensor data to the computing device(s) 634. In some examples, the vehicle 602 can send sensor data to the computing device(s) 634 at a particular frequency, after a lapse of a predetermined period of time, in near real-time, responsive to determining another vehicle is proximate the vehicle 602, etc.

The computing device(s) 634 can receive the sensor data (raw or processed) and can train data models based on the sensor data. In at least one example, the computing device(s) 634 can include one or more processors 636 and memory 638 communicatively coupled with the one or more processors 636. In the illustrated example, the memory 638 of the computing device(s) 634 stores a training system 640, a model database 642, and a sensor data storage 644.

The training system 640 can generate one or more machine learned models. In at least one example, sensor data can be input into a machine learned model. Such a machine learned model can identify and/or predict a particular behavior (e.g., parking) based on the input. As a non-limiting example, sensor data indicating that a vehicle proximate the vehicle 602 is moving toward the vehicle 602 (e.g., in a particular position relative to the vehicle, with a particular deceleration, etc.) can be input into an artificial neural network (ANN), the output of which can indicate that the vehicle is parking. In at least one example, the sensor data input into the ANN can indicate additional or alternative data such as a geolocation (which can correspond to a parking lot or other designated parking location) associated with the vehicle proximate the first vehicle, gesture data associated with the vehicle proximate the first vehicle, visual indications (e.g., blinkers, etc.) associated with the vehicle proximate the first vehicle, etc. as features and/or position, orientation, and/or velocity of the vehicle proximate the first vehicle as additional features. The input data can be analyzed by the ANN to generate a machine learned model that leverages similar information to determine when a vehicle is exhibiting parking behavior (e.g., is parking). That is, the machine learned model can output an indication that a vehicle proximate the vehicle is parking. In some examples, the output can be associated with some confidence level.

Although discussed in the context of neural networks, any type of machine learning can be used consistent with this disclosure. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some examples, the one or more machine learned models can be trained and stored in the model(s) storage 642. In some examples, the one or more machine learned models can be stored on and/or accessible to the vehicle computing device 604 for use by one or more of the systems associated with the vehicle computing device 604 in near-real time.

The sensor data storage 644 can store sensor data (raw or processed) received from one or more vehicles, such as vehicle 602. The sensor data in the sensor data storage 644 can represent sensor data collected by one or more onboard sensor systems (e.g., such as onboard sensor system(s) 606), or other sensor system(s), at previous time(s) (e.g., previously connected sensor data). In some examples, the sensor data can be stored in association with locations, entity types, and/or other types of characteristics. Additionally, in at least one example, behaviors determined from the sensor data can be stored in the sensor data storage 644. That is, the behaviors of individual entities can be associated with particular sensor data from which the behaviors were determined. In at least one example, the training system 640 can access the sensor data storage 644 for generating the machine learned model(s).

In at least one example, the vehicle 602 can transmit data to remote computing device(s) 646, via the network(s) 632. As described above, the remote computing device(s) 646 can be associated with a mobile device of a passenger and/or driver of another vehicle. Additionally and/or alternatively, the remote computing device(s) 646 can be associated with another vehicle. In some examples, the vehicle 602 can send raw sensor data to the remote computing device(s) 646. In other examples, the vehicle 602 can send processed sensor data to the remote computing device(s) 646. In at least one example, the vehicle 602 can send sensor data (e.g., raw or processed) to an intermediary device, which can send a representation of the sensor data to the remote computing device(s) 646. In some examples, the vehicle 602 can send sensor data to the remote computing device(s) 646 at a particular frequency, after a lapse of a predetermined period of time, in near real-time, responsive to determining that the second vehicle is proximate the first vehicle, moving toward the first vehicle and/or a parking location proximate the first vehicle, etc. The remote computing device(s) 646 can receive the sensor data (raw or processed) and can output the sensor data to assist an associated vehicle with parking and/or otherwise moving in an environment. In at least one example, the remote computing device(s) 646 can include one or more processors 648 and memory 650 communicatively coupled with the one or more processors 648. In the illustrated example, the memory 650 of the remote computing device(s) 646 stores a navigating application 652. In at least one example, the navigating application 652 can be downloaded by the remote computing device(s) 646.

The navigating application 652 can be configured to receive the sensor data (raw or processed) and generate one or more instructions to assist the associated vehicle with parking and/or otherwise navigating in an environment. In some examples, the one or more instructions can be output via a user interface 654 associated with the remote computing device(s) 646. In some examples, the user interface 654 can be an emitter (e.g., light, sound, etc.), as described above. In additional or alternative examples, the navigating application 652 can receive one or more instructions from the vehicle 602 and can output the one or more instructions via the user interface 654. In at least one example, the one or more instructions can be output as a visual indicator to the driver and/or passenger of an associated vehicle, an audible indicator to the driver and/or passenger, a combination of the two indicators, etc. In some examples, the visual indicator and/or audible indicator can be associated with a graphical user interface.

The processor(s) 616 of the vehicle 602, the processor(s) 636 of the computing device(s) 634, and the processor(s) of the remote computing device(s) 646 can be any suitable processor capable of executing instructions to process data and perform operations as described herein. By way of example and not limitation, the processor(s) 616, 636, and 648 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618, 638, and 650 are examples of non-transitory computer-readable media. Memory 618, 638, and 650 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 634 and/or components of the computing device(s) 634 can be associated with the vehicle 602. That is, the vehicle 602 can perform one or more of the functions associated with the computing device(s) 634, and vice versa.

FIGS. 7-11 are flowcharts showing example methods involving vehicle parking assist as described herein. The methods illustrated in FIGS. 7-11 are described with reference to the vehicle 602 shown in FIG. 6 for convenience and ease of understanding. However, the methods illustrated in FIGS. 7-11 are not limited to being performed using vehicle 602 shown in FIG. 6, and can be implemented using any of the other vehicles described in this application, as well as vehicles other than those described herein. Moreover, the vehicle 602 described herein is not limited to performing the methods illustrated in FIGS. 7-11.

The methods 700-1100 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 700-1100 can be combined in whole or in part with each other or with other methods.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Figure 7:
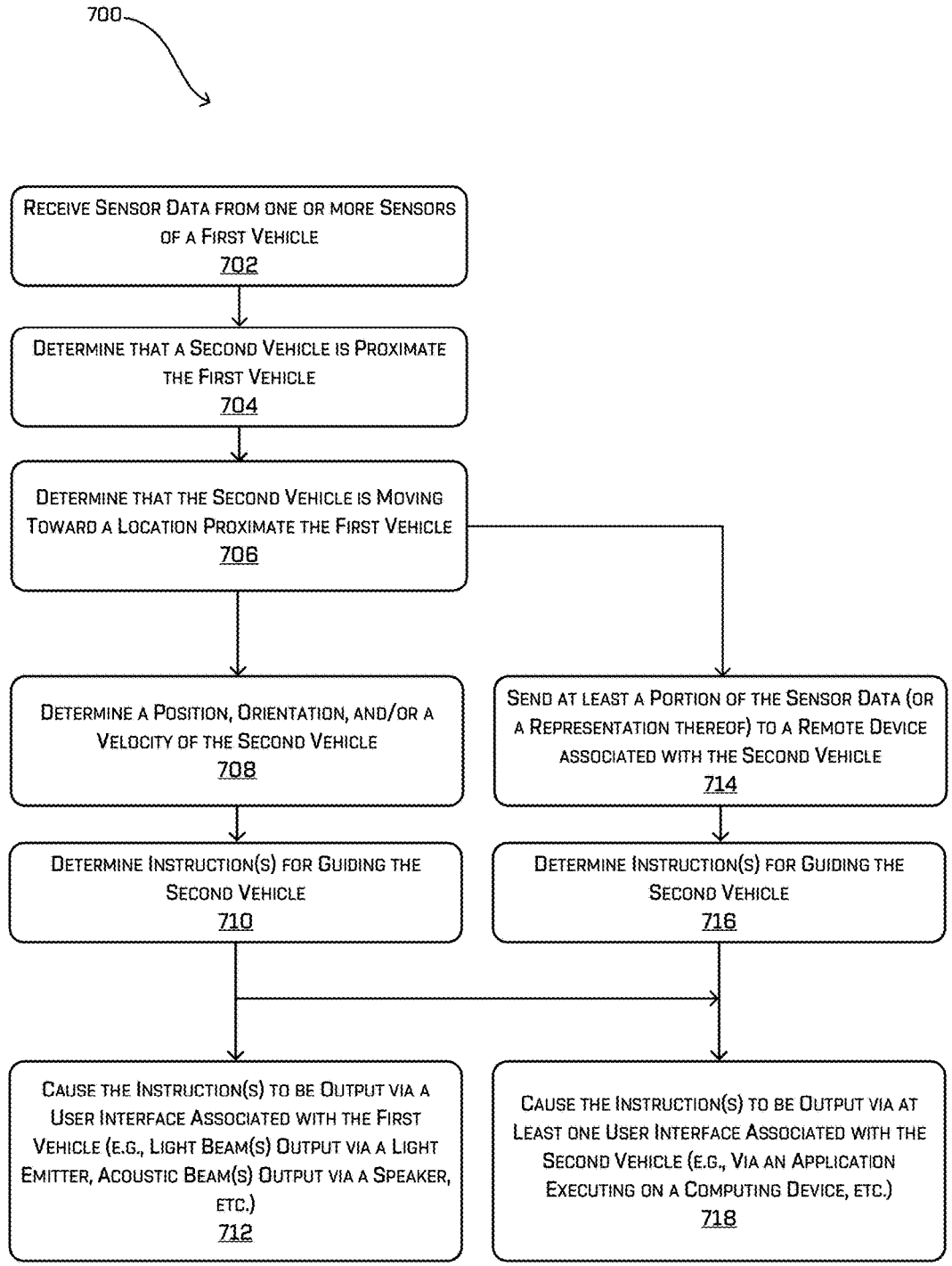
FIG. 7 is a flowchart illustrating an example method for causing instruction(s) to be output via at least one user interface to facilitate vehicle parking assist as described herein.

FIG. 7 is a flowchart illustrating an example method 700 for causing instruction(s) to be output via at least one user interface to facilitate vehicle parking assist as described herein.

Block 702 illustrates receiving sensor data from one or more sensors of a first vehicle. For the purpose of this discussion, the first vehicle can correspond to the vehicle 602, described above with reference to FIG. 6. As described above, in at least one example, the first vehicle can include sensor system(s) 606, which can be disposed on the first vehicle. The sensor system(s) 606 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc., as described above with reference to FIG. 6. The sensor system(s) 606 can provide input to the vehicle computing device 604, as described above.

Block 704 illustrates determining that a second vehicle is proximate the first vehicle. As described above, the vehicle computing device 604 can include a perception system 622. In at least one example, the perception system 622 can perform entity detection, segmentation, and/or classification based at least in part on sensor data received from the sensor system(s) 606. For instance, in at least one example, the perception system 622 can identify other entities, such as a second vehicle, in the environment within which the first vehicle is positioned.

Block 706 illustrates determining that the second vehicle is moving toward a location proximate the first vehicle. As described above, the vehicle computing device 604 can include the perception system 622 and a planning system 624, which can include a prediction system 626. In at least one example, the perception system 622 can perform entity detection, segmentation, and/or classification based at least in part on sensor data received from the sensor system(s) 606. As described above, in at least one example, the perception system 622 can determine, based at least in part on sensor data and/or map data, a parking location proximate the first vehicle.

In at least one example, the planning system 624 can determine routes and/or trajectories to use to control the first vehicle based at least in part on sensor data received from the sensor system(s) 606. In at least one example, the planning system 624 can include a prediction system 626 that can predict the behavior of other entities in the environment within which the first vehicle is positioned based at least in part on sensor data received from the sensor system(s) 606. In at least one example, the prediction system 626 can determine that a second vehicle in the environment within which the first vehicle is positioned is moving toward the first vehicle and/or a parking location proximate the first vehicle. In at least one example, the planning system 624 can utilize machine trained model(s) as described herein for determining that the second vehicle proximate the first vehicle is exhibiting a parking behavior (e.g., parking). In some examples, such a determination may additionally, or alternatively, comprise receiving a signal from a device operated by a user (e.g., driver, passenger, etc.) associated with the second vehicle requesting parking assistance.

Block 708 illustrates determining a position, orientation, and/or a velocity of the second vehicle. As described above, the vehicle computing device 604 can include the perception system 622. In at least one example, the perception system 622 can perform entity detection, segmentation, and/or classification based at least in part on sensor data received from the sensor system(s) 606. In at least one example, the perception system 622 can determine one or more of a position, orientation, or a velocity of other entities, such as the second vehicle, in the environment.

Block 710 illustrates determining instruction(s) for guiding the second vehicle. As described above, the vehicle computing device 604 can include an output determination system 630. The output determination system 630 can determine when to output an indication for providing instructions via a user interface. In at least one example, the output determination system 630 can receive perception data (e.g., data output via the perception system 622) to determine a position, an orientation, and/or a velocity of a second vehicle, such as the second vehicle, proximate the first vehicle. In at least one example, the output determination system 630 can generate, based at least in part on the position, the orientation, and/or the velocity of the second vehicle, one or more instructions that are to be output via a user interface for guiding the second vehicle (e.g., away from the first vehicle and/or into a parking location). In some examples, the output determination system 630 can receive updated perception data (e.g., in near-real time) and can update the one or more instructions based at least in part on the updated perception data. That is, the output determination system 630 can track the position, the orientation, and/or the velocity of the second vehicle and can update the one or more instructions based on changes to the position, the orientation, and/or the velocity of the second vehicle.

In at least one example, the output determination system 630 can determine a region around the first vehicle, as described above with reference to FIGS. 1-5. In at least one example, the region can correspond to a minimum intended distance between the first vehicle and a second vehicle. In at least one example, the output determination system 630 can utilize the perception data to determine the position and/or the orientation of the second vehicle relative to the first vehicle. In at least one example, responsive to the second vehicle entering the region, the output determination system 630 can generate one or more instructions for guiding the second vehicle and can output the one or more instructions for guiding the second vehicle. As described above, in at least one example, such instruction(s) can be used to alert and/or guide the second vehicle. Additional details associated with generating instructions responsive to determining that the second vehicle enters the region are described below with reference to FIG. 8.

In additional or alternative examples, the output determination system 630 can receive perception data indicating that a second vehicle is proximate the first vehicle and/or guiding to a parking location proximate the first vehicle. Responsive to receiving such an indication (and/or receiving a request for parking assistance), the output determination system 630 can generate one or more instructions for guiding the second vehicle. That is, responsive to receiving such an indication, the output determination system 630 can output the one or more instructions for guiding the second vehicle. As described above, in some examples, the output determination system 630 can receive updated perception data (e.g., in near-real time) and can update the one or more instructions based at least in part on the updated perception data. That is, the output determination system 630 can track the position, orientation, and/or velocity of the second vehicle and can update the one or more instructions based on changes to the position, the orientation and/or the velocity of the second vehicle.

Block 712 illustrates causing the instructions to be output via a user interface associated with the first vehicle. As described above, the output determination system 630 can send the one or more instructions to one or more user interfaces so as to cause the one or more instructions to be output. As described above, the one or more instructions for guiding a second vehicle can be associated with a visual indication, an audible indication, a combination of visual indication(s) and/or audible indication(s), etc. For instance, the visual indication can be associated with one or more light beams that are output via a light emitter, as described herein. As described above, in at least one example, a light emitter can be a projector and/or an electronic display (e.g., an electronic billboard, etc.). Examples of the one or more instructions being output via a light emitter is described above with reference to FIGS. 1 and 2. In some examples, the audible indication can be associated with an acoustic beam that is output via a sound emitter, described below. An example of the one or more instructions being output via a sound emitter is described above with reference to FIG. 3.

In some examples, the output determination system 630 can determine that another similar vehicle is proximate the first vehicle (e.g., another autonomous vehicle) and the output determination system 630 can generate one or more instructions for guiding the second vehicle that can be output by the first vehicle and the other similar vehicle at a same and/or similar time (e.g., via a composite indication). In such an example, the output determination system 630 can transmit the one or more instructions (or at least a portion thereof) to a computing system associated with the other similar vehicle(s). Such an example is described above with reference to FIG. 5 and additional details are provided below with respect to FIG. 10.

Block 714 illustrates sending at least a portion of the sensor data (or a representation thereof) to a remote device associated with the second vehicle. As described above, in at least one example, the first vehicle can transmit data to remote computing device(s) 646, via the network(s) 632. As described above, the remote computing device(s) 646 can be associated with a mobile device of a passenger and/or driver of a second vehicle. Additionally and/or alternatively, the remote computing device(s) 646 can be associated with a second vehicle, such as the second vehicle. In some examples, the first vehicle can send raw sensor data to the remote computing device(s) 646. In other examples, the first vehicle can send processed sensor data to the remote computing device(s) 646. In some examples, the first vehicle can send sensor data to the remote computing device(s) 646 at a particular frequency, after a lapse of a predetermined period of time, in near real-time, responsive to determining that the second vehicle is proximate the first vehicle, moving toward the first vehicle and/or a parking location proximate the first vehicle, etc. The remote computing device(s) 646 can receive the sensor data (raw or processed) and can output a representation of the sensor data to assist the second vehicle with parking and/or otherwise moving in an environment.

In at least one example, the first vehicle can transmit raw and/or processed sensor data to intermediary device(s) (e.g., serving computing device(s), cloud-based storage device(s), etc.), and representations of such sensor data can be transmitted to the remote computing device(s) 646. In some examples, the intermediary device(s) can determine at least a portion of the instruction(s) for guiding the second vehicle.

Block 716 illustrates determining instruction(s) for guiding the second vehicle. The navigating application 652 can be configured to receive the sensor data (raw or processed) and generate one or more instructions to assist the second vehicle with parking and/or otherwise moving in an environment. In examples where an intermediary device determines at least a portion of the instruction(s), the navigating application 652 can determine the instruction(s) based at least in part on the instruction(s) received from the intermediary device(s).

Block 718 illustrates causing the instruction(s) to be output via at least one user interface associated with the second vehicle. In some examples, the one or more instructions can be output via a user interface 654 associated with the remote computing device(s) 646. In some examples, the user interface 654 can be an emitter (e.g., light, sound, etc.), as described above. In additional or alternative examples, the navigating application 652 can receive one or more instructions from the first vehicle and can output the one or more instructions via the user interface 654. In at least one example, the one or more instructions can be output as a visual indicator to the driver and/or passenger of an associated vehicle, an audible indicator to the driver and/or passenger, a combination of the two indicators, etc. In some examples, the visual indicator and/or audible indicator can be associated with a graphical user interface output via an electronic display.

In an additional or alternative example, the output determination system 630 can transmit data (e.g., a signal) associated with the one or more instructions to a remote device (e.g., remote computing device(s) 646) associated with the second vehicle. An example of the one or more instructions being transmitted to a remote device associated with a second vehicle is described above with reference to FIG. 4. As described above, the remote device can be a mobile device operated by a driver and/or passenger of a second vehicle and an application (e.g., navigating application 652) executing on the mobile device can cause the one or more instructions to be output via a display associated with the mobile device. Additionally and/or alternatively, the remote device can be associated with a computing system of the second vehicle, as described above.

Figure 8:
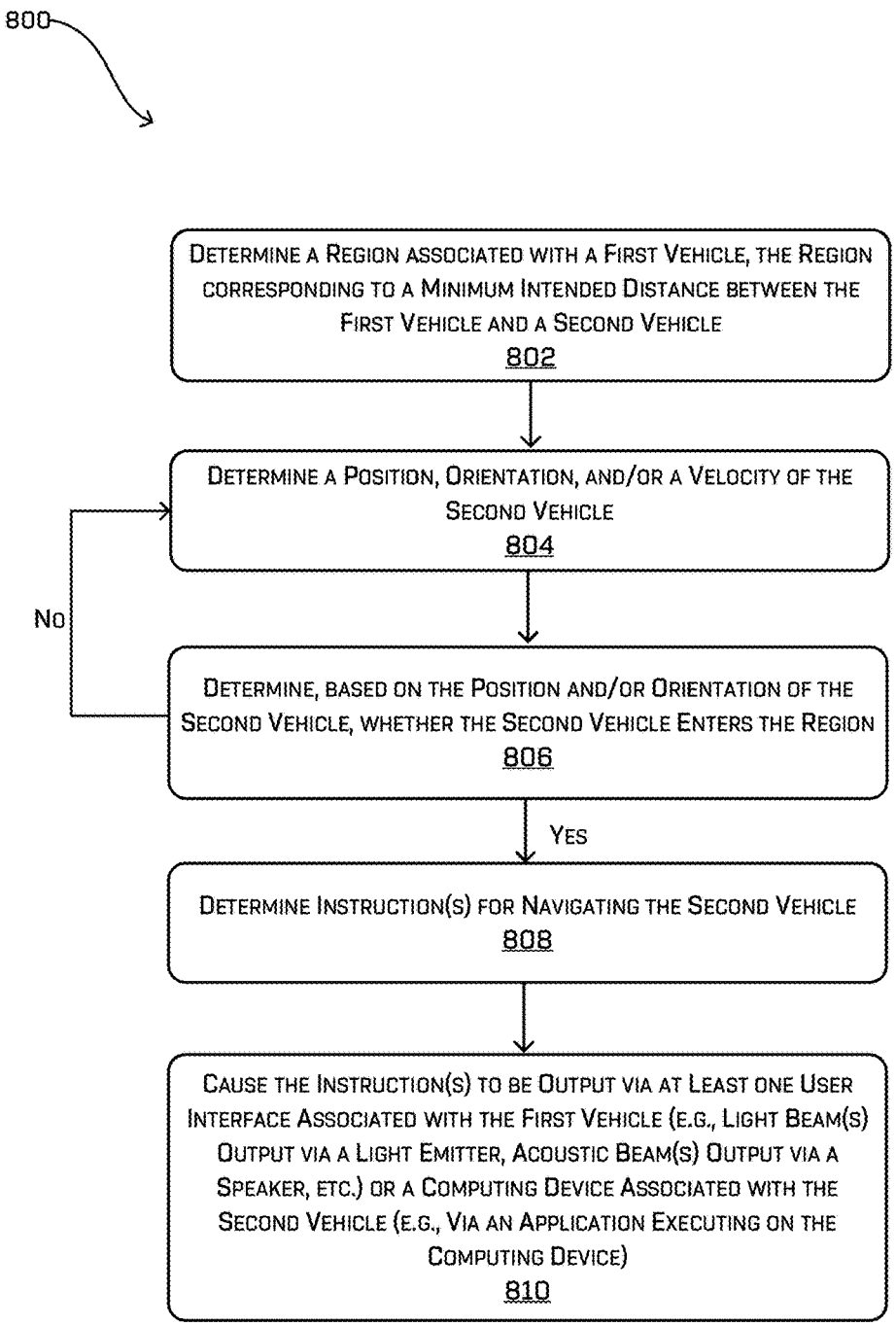
FIG. 8 is a flowchart illustrating an example method for causing instruction(s) to be output via at least one user interface to facilitate vehicle parking assist as described herein.

FIG. 8 is a flowchart illustrating an example method 800 for causing instruction(s) to be output via at least one user interface to facilitate vehicle parking assist as described herein.

Block 802 illustrates determining a region associated with a first vehicle, the region corresponding to a minimum intended distance between the first vehicle and a second vehicle. For the purpose of this discussion, the first vehicle can correspond to the vehicle 602, as described above with reference to FIG. 6. In at least one example, the output determination system 630 can determine a region around the first vehicle, as described above with reference to FIGS. 1-5. In at least one example, the region can correspond to a minimum intended distance between the first vehicle and a second vehicle. The minimum intended distance can be measured from any surface of the first vehicle. In some examples, the region can be dynamically determined. For example, the output determination system 630 can determine the region based on weather conditions, surface traction, time of day, characteristic(s) of a second vehicle, etc.

Block 804 illustrates determining a position, an orientation, and/or a velocity of the second vehicle. As described above, in at least one example, the output determination system 630 can utilize the perception data to determine the position, the orientation, and/or the velocity of the second vehicle relative to the first vehicle.

Block 806 illustrates determining, based on the position and/or the orientation of the second vehicle, whether the second vehicle enters the region. In at least one example, the output determination system 630 can utilize the position and/or the orientation of the second vehicle to determine whether the second vehicle enters the region. Responsive to the second vehicle entering the region and/or receiving a request to provide parking instructions, the output determination system 630 can generate one or more instructions for guiding the second vehicle and can output the one or more instructions for guiding the second vehicle, as illustrated in block 808. In at least one example, such instruction(s) can alert the second vehicle that the vehicle is likely to collide with the first vehicle. If the position and/or the orientation does not indicate that the second vehicle is in the region, the output determination system 630 can continue to determine the position, the orientation, and/or the velocity of the second vehicle (as shown by the arrow returning to block 804).

Block 810 illustrates causing the instructions to be output via at least one user interface associated with the first vehicle or a computing device associated with the second vehicle. As described above, the one or more instructions for guiding a second vehicle, such as the second vehicle, can be associated with a visual indication, an audible indication, a combination of visual indication(s) and/or audible indication(s), etc. For instance, the visual indication can be associated with one or more light beams that are output via a light emitter, as described herein. As described above, in at least one example, a light emitter can be a projector and/or an electronic display (e.g., an electronic billboard, etc.). Examples of the one or more instructions being output via a light emitter is described above with reference to FIGS. 1 and 2. In some examples, the audible indication can be associated with an acoustic beam that is output via a sound emitter, described below. An example of the one or more instructions being output via a sound emitter is described above with reference to FIG. 3. Furthermore, in at least one example, the one or more instructions can be transmitted to a remote device associated with the second vehicle. An example of the one or more instructions being transmitted to a remote device associated with the second vehicle is described above with reference to FIG. 4. As described above, the remote device can be a mobile device operated by a driver and/or passenger of the second vehicle and a downloadable application executing on the mobile device can cause the one or more instructions to be output via a display associated with the mobile device. Additionally and/or alternatively, the remote device can be associated with a computing system of the other device, as described above.

Figure 9:
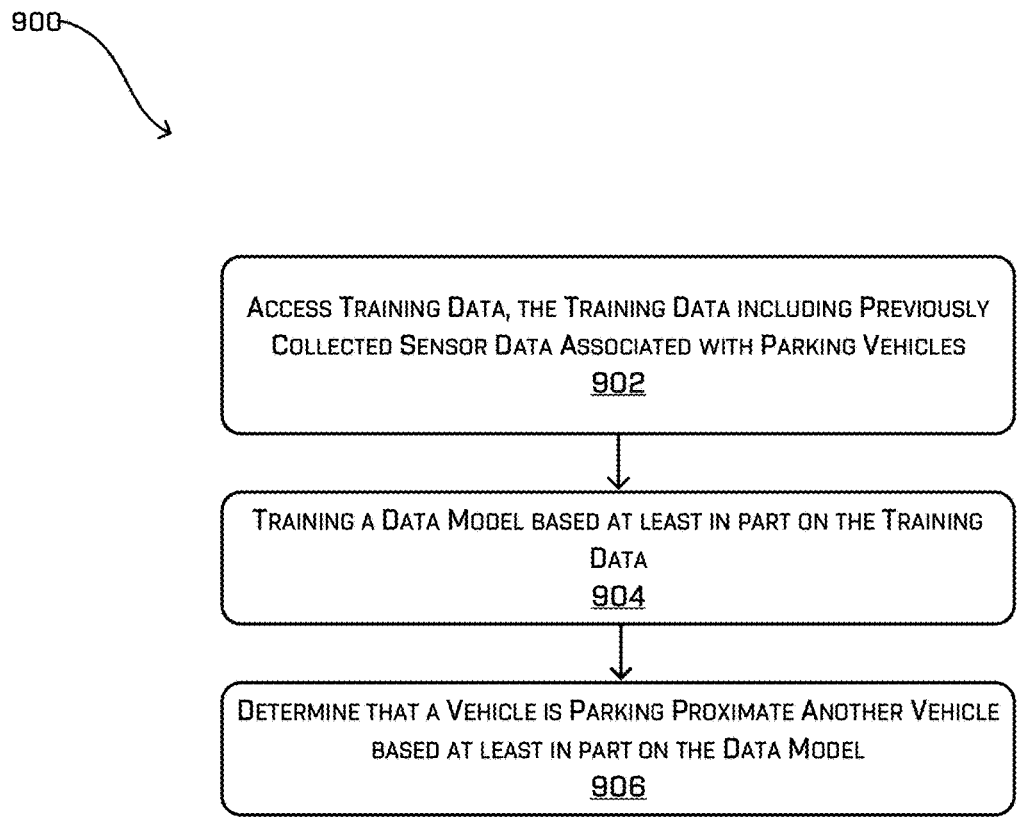
FIG. 9 is a flowchart illustrating an example method for training a data model to determine that a vehicle is moving toward another vehicle as described herein.

FIG. 9 is a flowchart illustrating an example method 900 for training a data model to determine that a vehicle is moving toward a second vehicle as described herein.

Block 902 illustrates accessing training data, the training data including previously collected sensor data associated with parking vehicles. As described above, the sensor data storage 644 can store sensor data (raw or processed) received from one or more vehicles, such as the vehicle 602. The sensor data in the sensor data storage 644 can represent sensor data collected by one or more onboard sensor systems (e.g., such as onboard sensor system(s) 606), or other sensor system(s), at previous time(s) (e.g., previously connected sensor data). In some examples, the sensor data can be stored in association with locations, entity types, and/or other types of characteristics. Additionally, in at least one example, behaviors determined from the sensor data can be stored in the sensor data storage 644. That is, the behaviors of individual entities can be associated with particular sensor data from which the behaviors were determined. In at least one example, the training system 640 can access the sensor data storage 644 for generating the machine learned model(s).

Block 904 illustrates training a data model based at least in part on the training data. The training system 640 can generate one or more machine learned models. In at least one example, sensor data can be input into a machine learned model. Such a machine learned model can identify and/or predict a particular behavior (e.g., parking) based on the input. As a non-limiting example, sensor data indicating that a vehicle proximate the first vehicle is moving toward the first vehicle (e.g., in a particular position relative to the vehicle, with a particular deceleration, etc.) can be input into an ANN, the output of which can indicate that the vehicle is parking. In at least one example, the sensor data input into the ANN can indicate additional or alternative data such as a geolocation (which can correspond to a parking lot or other designated parking location) associated with the vehicle proximate the first vehicle, gesture data associated with the vehicle proximate the first vehicle, visual indications (e.g., blinkers, etc.) associated with the vehicle proximate the first vehicle, etc. as features and/or position, orientation, and/or velocity of the vehicle proximate the first vehicle as additional features. The input data can be analyzed by the ANN to generate a machine learned model that leverages similar information to determine when a vehicle is exhibiting parking behavior (e.g., is parking). That is, the machine learned model can output an indication that a vehicle proximate the vehicle is parking. In some examples, the output can be associated with some confidence level.

Although discussed in the context of neural networks, any type of machine learning can be used consistent with this disclosure. Examples of machine learning algorithms are discussed above with reference to FIG. 6.

In some examples, the one or more machine learned models can be trained and stored in the model(s) storage 642. In some examples, the one or more machine learned models can be stored on and/or accessible to the vehicle computing device 604 for use by one or more of the systems associated with the vehicle computing device 604 in near-real time.

Block 906 illustrates determining that a vehicle is parking proximate a second vehicle based at least in part on the data model. As described above, a vehicle computing device 604 associated with a first vehicle can include the perception system 622 and a planning system 624, which can include a prediction system 626. In at least one example, the perception system 622 can perform entity detection, segmentation, and/or classification based at least in part on sensor data received from the sensor system(s) 606. As described above, in at least one example, the perception system 622 can determine, based at least in part on sensor data and/or map data, a parking location proximate the first vehicle.

In at least one example, the planning system 624 can determine routes and/or trajectories to use to control the first vehicle based at least in part on sensor data received from the sensor system(s) 606. In at least one example, the planning system 624 can include a prediction system 626 that can predict the behavior of other entities in the environment within which the first vehicle is positioned based at least in part on sensor data received from the sensor system(s) 606. In at least one example, the prediction system 626 can determine that a second vehicle in the environment within which the first vehicle is positioned is moving toward the first vehicle and/or a parking location proximate the first vehicle. In at least one example, the planning system 624 can utilize the machine trained model(s) for determining that a second vehicle proximate the first vehicle is exhibiting a parking behavior (e.g., parking).

Figure 10:
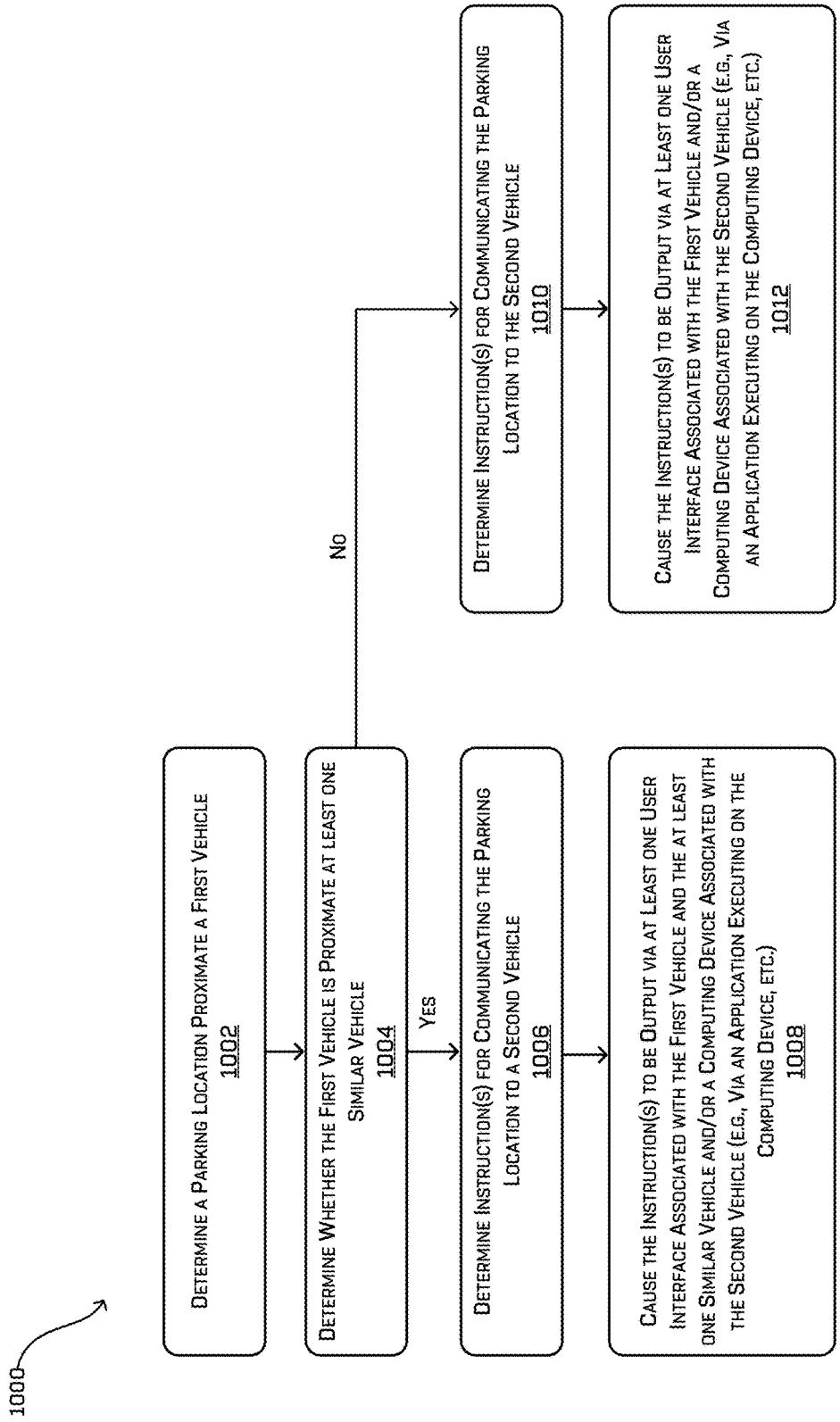
FIG. 10 is a flowchart illustrating an example method for determining a parking location proximate a vehicle and causing instruction(s) to be output via at least one user interface to facilitate vehicle parking assist as described herein.

FIG. 10 is a flowchart illustrating an example method 1000 for determining a parking location proximate a vehicle and causing instruction(s) to be output via at least one user interface to facilitate vehicle parking assist as described herein.

Block 1002 illustrates determining a parking location proximate a first vehicle. The first vehicle can correspond to the vehicle 602, described above. As described above, the vehicle computing device 604 can include the perception system 622 and a planning system 624, which can include a prediction system 626. In at least one example, the perception system 622 can perform entity detection, segmentation, and/or classification based at least in part on sensor data received from the sensor system(s) 606. As described above, in at least one example, the perception system 622 can determine, based at least in part on sensor data and/or map data, a parking location proximate the first vehicle.

Block 1004 illustrates determining whether the first vehicle is proximate at least one similar vehicle. In some examples, the output determination system 630 can determine that another similar vehicle is proximate the first vehicle (e.g., another autonomous vehicle). For instance, in at least one example, the output determination system 630 can receive an indication from a proximate vehicle that the proximate vehicle is capable of exchanging information with the first vehicle and/or otherwise shares at least one characteristic with the first vehicle.

Block 1006 illustrates determining instruction(s) for communicating the parking location to a second vehicle. In at least one example, the output determination system 630 can determine one or more instructions for communicating the parking location to a second vehicle. For instance, in at least one example, the output determination system 630 can generate, based at least in part on a position, an orientation, and/or a velocity of a second vehicle, one or more instructions that are to be output via a user interface for communicating the parking location to the second vehicle.

Block 1008 illustrates causing the instructions to be output via at least one user interface associated with the first vehicle and the at least one similar vehicle and/or a computing device associated with the second vehicle. In at least one example, the output determination system 630 can transmit data (e.g., a signal) associated with the one or more instructions (or at least a portion thereof) to a computing system associated with the other similar vehicle(s). The output determination system 630 can cause the one or more instructions to be output by the first vehicle and the other similar vehicle(s) at a same and/or similar time (e.g., via a composite indication), as described above with reference to FIG. 5.

In at least one example, the output determination module 630 can determine that the first vehicle is not proximate any similar vehicle(s). In such an example, the output determination system 630 can determine one or more instructions for communicating the parking location to the second vehicle, as illustrated in block 1010. For instance, in at least one example, the output determination system 630 can generate, based at least in part on a position, orientation, and/or a velocity of the second vehicle, one or more instructions that are to be output via a user interface for communicating the parking location to the second vehicle. In at least one example, the output determination system 630 can cause the one or more instructions to be output via at least one user interface associated with the vehicle and/or a computing device associated with the second vehicle, as illustrated in block 1012. Additional details associated with outputting the one or more instructions are described above with reference to block 712 and/or 718 of FIG. 7.

Figure 11:
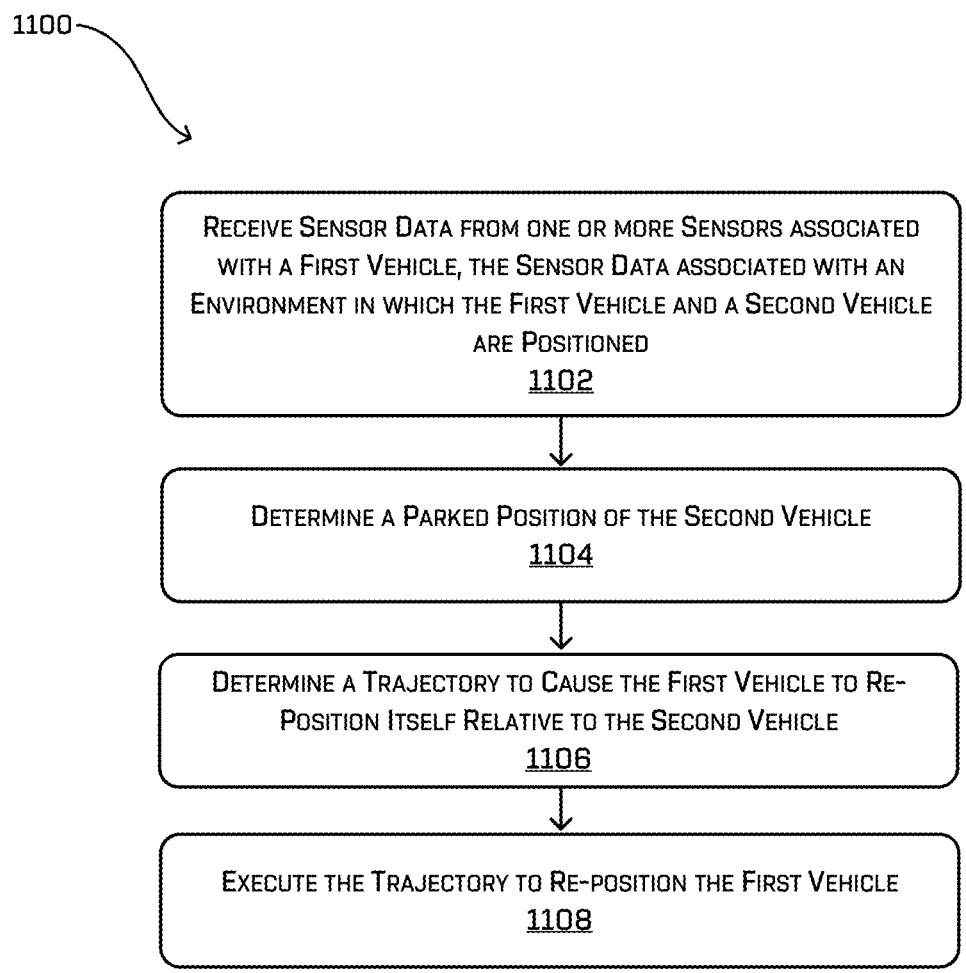
FIG. 11 is a flowchart illustrating an example method for repositioning a vehicle relative to a parked vehicle as described herein.

FIG. 11 is a flowchart illustrating an example method 1100 for repositioning a vehicle relative to a parked vehicle as described herein.

Block 1102 illustrates receiving sensor data from one or more sensors associated with a first vehicle, the sensor data associated with an environment in which the first vehicle and a second vehicle are positioned. For the purpose of this discussion, the first vehicle can correspond to the vehicle 602, described above with reference to FIG. 6. As described above, in at least one example, the first vehicle can include sensor system(s) 606, which can be disposed on the first vehicle. The sensor system(s) 606 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc., as described above with reference to FIG. 6. The sensor system(s) 606 can provide input to the vehicle computing device 604, as described above.

Block 1104 illustrates determining a parked position of the second vehicle. As described above, the first vehicle can include a vehicle computing device 604, which can include a perception system 622. In at least one example, the perception system 622 can perform entity detection, segmentation, and/or classification based at least in part on sensor data received from the sensor system(s) 606. For instance, in at least one example, the perception system 622 can identify other entities, such as the second vehicle, in the environment within which the first vehicle is positioned. Additionally, the perception system 622 can determine a position and/or an orientation of the second vehicle based at least in part on the sensor data.

Block 1106 illustrates determining a trajectory to cause the first vehicle to reposition itself relative to the second vehicle. In at least one example, the vehicle computing device 604 can include a planning system 624, as described above. The planning system 624 can determine routes and/or trajectories to use to control the first vehicle based at least in part on sensor data received from the sensor system(s) 606. In at least one example, responsive to determining the position and/or orientation of the second vehicle, the planning system 624 can determine to reposition the first vehicle to maximize the distance and/or space between the first vehicle and the second vehicle. Such a repositioning may be necessary, for example, to allow passengers to ingress and/or egress from the vehicle 602 when a second vehicle parks too closely. Accordingly, the planning system 624 can generate a trajectory for causing the first vehicle to reposition itself.

Block 1108 illustrates executing the trajectory. In at least one example, the planning system 624 can transmit the trajectory to the drive module(s) 614. The drive module(s) 614 can execute the trajectory such to cause the first vehicle to move in at least one direction. In at least one example, the first vehicle can be bidirectional, allowing the first vehicle to move in two or more directions (e.g., front or back).

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A. A system associated with an autonomous vehicle for providing parking assistance to a parking vehicle, the system comprising: one or more sensors on the autonomous vehicle; one or more processors; and one or more non-transitory computer-readable media storing instructions executable by the one or more processors, wherein the instructions, that when executed by the one or more processors, cause the one or more processors to perform actions comprising: receiving sensor data from the one or more sensors, wherein at least a portion of the sensor data is associated with the parking vehicle; determining, based at least in part on the sensor data, the parking vehicle is moving toward a parking location proximate the autonomous vehicle; tracking, based at least in part on the sensor data, a position, an orientation, or a velocity of the parking vehicle with respect to the parking location; and causing, based at least in part on tracking the position, the orientation, or the velocity, an indication to be output via one or more visual or audio outputs associated with the autonomous vehicle, the indication providing one or more instructions for guiding the parking vehicle into the parking location.

B. The system as paragraph A recites, wherein the one or more sensors include at least a light detection and ranging (LIDAR) sensor, a radio detection and ranging (RADAR)

sensor, a sound navigation and ranging (SONAR) sensor, a location sensor, an inertial sensor, a camera, a microphone, or an environment sensor.

C. The system as paragraph A or B recites, the actions further comprising: determining a region around the autonomous vehicle, wherein the region corresponds to a minimum intended distance between the parking vehicle and the autonomous vehicle; determining, based at least in part on the position or the orientation of the parking vehicle, that the parking vehicle enters the region; and causing the indication to be output responsive to determining that the parking vehicle enters the region.

D. The system as any of paragraphs A-C recite, wherein the indication is a light beam output via a light emitter associated with the autonomous vehicle, the light beam forming a visual indication associated with the one or more instructions.

E. The system as paragraph D recites, wherein the light emitter is a projector and the light beam is projected onto at least a portion of the parking vehicle or a surface proximate the parking vehicle.

F. The system as any of paragraphs A-E recite, the actions further comprising: receiving a signal indicative of a request for parking assistance; and causing, based at least in part on receiving the signal, the indication to be output via the one or more visual or audio outputs associated with the autonomous vehicle.

G. The system as any of paragraphs A-F recite, wherein the indication is an acoustic beam that is output via a speaker associated with the autonomous vehicle.

H. A method comprising: receiving first sensor data from one or more sensors associated with the first vehicle, the first sensor data associated with a second vehicle; receiving an indication that the second vehicle is proximate the first vehicle; determining, based at least in part on the first sensor data, that the second vehicle is moving toward a location proximate the first vehicle; determining, based at least in part on the first sensor data, a position, an orientation, or a velocity of the second vehicle; and causing, based at least in part on determining the position, the orientation, or the velocity, one or more instructions for guiding the second vehicle to be output via a user interface.

I. The method as paragraph H recites, further comprising: receiving second sensor data from the one or more sensors, the second sensor data associated with an environment within which the first vehicle and the second vehicle are positioned; and determining, based at least in part on the second sensor data, a parking location proximate the first vehicle.

J. The method as paragraph I recites, further comprising: determining, based at least in part on the position, the orientation, or the velocity of the second vehicle, that the second vehicle is moving toward the parking location; and causing, based at least in part on tracking the position, the orientation, or the velocity of the second vehicle, the one or more instructions to be output via the user interface.

K. The method as any of paragraphs H-J recite, further comprising: training a data model based at least in part on previously collected sensor data associated with parking vehicles; and determining that the second vehicle is moving toward the parking location based at least in part on analyzing the first sensor data with the data model.

L. The method as paragraph K recites, wherein the user interface is associated with the first vehicle, and the method further comprises sending, to at least a third vehicle, an indication of the parking location proximate the first vehicle and an instruction associated with the one or more instructions.

M. The method as any of paragraphs H-L recite, further comprising: determining, based at least in part on the first sensor data, a second position, a second orientation, or a second velocity of the second vehicle; and causing, based at least in part on determining the second position, the second orientation, or the second velocity, one or more additional instructions for guiding the second vehicle to be output via the user interface.

N. The method as any of paragraphs H-M recite, wherein the user interface is associated with an audio or visual output associated with the first vehicle.

O. The method as any of paragraphs H-N recite, wherein the user interface is associated with an application executing on a device operated by at least one of a driver of the second vehicle, a passenger of the second vehicle, or a computing system associated with the second vehicle.

P. A non-transitory computer-readable medium having a set of instructions that, when executed by one or more processors, cause the one or more processors to perform operations comprising: receiving, from one or more sensors associated with a first vehicle, first sensor data associated with a second vehicle; receiving an indication that a second vehicle is proximate the first vehicle; determining, based at least in part on the first sensor data, that the second vehicle is moving toward a location proximate the first vehicle; determining, based at least in part on the first sensor data, a position, an orientation, or a velocity of the second vehicle; and sending, based at least in part on determining the position, the orientation, or the velocity, a signal configured to cause one or more instructions for guiding the second vehicle to be output via a user interface.

Q. The non-transitory computer-readable medium as paragraph P recites, the operations further comprising: receiving, from the one or more sensors, second sensor data associated with an environment within which the first vehicle and the second vehicle are positioned; determining, based at least in part on the second sensor data or map data associated with the environment, a parking location proximate the first vehicle; determining, based at least in part on the position, the orientation, or the velocity of the second vehicle, that the second vehicle is moving toward the parking location; and sending the signal configured to cause the one or more instructions to be output via the user interface based at least in part on determining that the second vehicle is moving toward the parking location.

R. The non-transitory computer-readable medium as paragraph P or Q recites, the operations further comprising: training a data model based at least in part on previously collected sensor data associated with parking vehicles; and determining that the second vehicle is moving toward to the parking location based at least in part on analyzing the first sensor data with the data model.

S. The non-transitory computer-readable medium as any of paragraphs P-R recite, the operations further comprising: receiving a request for parking assistance; and sending the signal configured to cause the one or more instructions to be output via the user interface based at least in part on receiving the request for parking assistance.

T. The non-transitory computer-readable medium as any of paragraphs P-S recite, wherein the user interface is associated with at least one of an audio output associated with the first vehicle or a visual output associated with the first vehicle, or a remote device associated with the second vehicle.

U. While paragraphs A-G are described above with respect to a system, it is understood in the context of this document that the content of paragraphs A-G may also be implemented via a method, device, and/or computer storage media. While paragraphs H-O are described above with respect to a method, it is understood in the context of this document that the content of paragraphs H-O may also be implemented via a system, device, and/or computer storage media. While paragraphs P-T are described above with respect to a non-transitory computer-readable medium, it is understood in the context of this document that the content of paragraphs P-T may also be implemented via a method, device, and/or system.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system associated with an autonomous vehicle for providing parking assistance to a parking vehicle, the system comprising:
one or more sensors on the autonomous vehicle;
one or more processors; and
one or more non-transitory computer-readable media storing instructions executable by the one or more processors, wherein the instructions, when executed by the one or more processors, cause the one or more processors to perform actions comprising:
receiving sensor data from the one or more sensors, wherein at least a portion of the sensor data is associated with the parking vehicle;
determining, based at least in part on the sensor data, the parking vehicle is moving toward a parking location proximate the autonomous vehicle;
tracking, based at least in part on the sensor data, a position, an orientation, or a velocity of the parking vehicle with respect to the parking location; and
causing, based at least in part on tracking the position, the orientation, or the velocity, an indication to be output via one or more visual or audio outputs associated with the autonomous vehicle, the indication providing one or more instructions for guiding the parking vehicle into the parking location, wherein the indication comprises at least one of:
a light beam output via a light emitter associated with the autonomous vehicle, the light beam forming a visual indication associated with the one or more instructions; or
an acoustic beam that is output via a speaker associated with the autonomous vehicle.

2. The system as claim 1 recites, wherein the one or more sensors include at least a light detection and ranging (LIDAR) sensor, a radio detection and ranging (RADAR) sensor, a sound navigation and ranging (SONAR) sensor, a location sensor, an inertial sensor, a camera, a microphone, or an environment sensor.

3. The system as claim 1 recites, the actions further comprising:
determining a region around the autonomous vehicle, wherein the region corresponds to a minimum intended distance between the parking vehicle and the autonomous vehicle;
determining, based at least in part on the position or the orientation of the parking vehicle, that the parking vehicle enters the region; and
causing the indication to be output responsive to determining that the parking vehicle enters the region.

4. The system as claim 1 recites, wherein the indication is the light beam, and wherein the light emitter is a projector and the light beam is projected onto at least a portion of the parking vehicle or a surface proximate the parking vehicle.

5. The system as claim 1 recites, the actions further comprising:
receiving a signal indicative of a request for parking assistance; and
causing, based at least in part on receiving the signal, the indication to be output via the one or more visual or audio outputs associated with the autonomous vehicle.

6. A method comprising:
receiving first sensor data from one or more sensors associated with the first vehicle, the first sensor data associated with a second vehicle;
receiving an indication that the second vehicle is proximate the first vehicle;
determining, based at least in part on the first sensor data, that the second vehicle is moving toward a location proximate the first vehicle;
determining, based at least in part on the first sensor data, a position, an orientation, or a velocity of the second vehicle;
causing, based at least in part on determining the position, the orientation, or the velocity, one or more instructions for guiding the second vehicle to be output via a user interface;
determining, based at least in part on the first sensor data, a second position, a second orientation, or a second velocity of the second vehicle; and
causing, based at least in part on determining the second position, the second orientation, or the second velocity, one or more additional instructions for guiding the second vehicle to be output via the user interface.

7. The method as claim 6 recites, further comprising:
receiving second sensor data from the one or more sensors, the second sensor data associated with an environment within which the first vehicle and the second vehicle are positioned; and
determining, based at least in part on the second sensor data, a parking location proximate the first vehicle.

8. The method as claim 7 recites, further comprising:
determining, based at least in part on the position, the orientation, or the velocity of the second vehicle, that the second vehicle is moving toward the parking location; and
causing, based at least in part on tracking the position, the orientation, or the velocity of the second vehicle, the one or more instructions to be output via the user interface.

9. The method as claim 8 recites, further comprising:
training a data model based at least in part on previously collected sensor data associated with parking vehicles; and
determining that the second vehicle is moving toward the parking location based at least in part on analyzing the first sensor data with the data model.

10. The method as claim 7 recites, wherein the user interface is associated with the first vehicle, and the method further comprises sending, to at least a third vehicle, an indication of the parking location proximate the first vehicle and an instruction associated with the one or more instructions.

11. The method as claim 6 recites, wherein the user interface is associated with an audio or visual output associated with the first vehicle.

12. The method as claim 6 recites, wherein the user interface is associated with an application executing on a device operated by at least one of a driver of the second vehicle, a passenger of the second vehicle, or a computing system associated with the second vehicle.

13. A non-transitory computer-readable medium having a set of instructions that, when executed by one or more processors, cause the one or more processors to perform operations comprising:
receiving, from one or more sensors associated with a first vehicle, first sensor data associated with a second vehicle;
receiving an indication that a second vehicle is proximate the first vehicle;
determining, based at least in part on the first sensor data, that the second vehicle is moving toward a location proximate the first vehicle;
determining, based at least in part on the first sensor data, a position, an orientation, or a velocity of the second vehicle;
sending, based at least in part on determining the position, the orientation, or the velocity, a signal configured to cause one or more instructions for guiding the second vehicle to be output via a user interface;
receiving, from the one or more sensors, second sensor data associated with an environment within which the first vehicle and the second vehicle are positioned;
determining, based at least in part on the second sensor data or map data associated with the environment, a parking location proximate the first vehicle;
determining, based at least in part on the position, the orientation, or the velocity of the second vehicle, that the second vehicle is moving toward the parking location; and sending the signal configured to cause the one or more instructions to be output via the user interface based at least in part on determining that the second vehicle is moving toward the parking location.

14. The non-transitory computer-readable medium as claim 13 recites, the operations further comprising:
training a data model based at least in part on previously collected sensor data associated with parking vehicles; and
determining that the second vehicle is moving toward to the parking location based at least in part on analyzing the first sensor data with the data model.

15. The non-transitory computer-readable medium as claim 13 recites, the operations further comprising:
receiving a request for parking assistance; and
sending the signal configured to cause the one or more instructions to be output via the user interface is further based at least in part on receiving the request for parking assistance.

16. The non-transitory computer-readable medium as claim 13 recites, wherein the user interface is associated with at least one of an audio output associated with the first vehicle or a visual output associated with the first vehicle, or a remote device associated with the second vehicle.

17. The system as claim 1 recites, the action further comprising:
receiving second sensor data from one or more second sensors on a second vehicle, wherein at least a portion of the second sensor data is associated with the parking vehicle;
determining, based at least in part on the second sensor data, that the parking vehicle is moving toward the parking location;
tracking, based at least in part on the second sensor data, a second position, a second orientation, or a second velocity of the parking vehicle with respect to the parking location; and
causing, based at least in part on tracking the second position, the second orientation, or the second velocity, a second indication to be output via one or more second visual or audio outputs associated with the second vehicle, the second indication providing one or more second instructions for guiding the parking vehicle into the parking location.

18. The system as claim 17 recites, wherein the second vehicle is a second autonomous vehicle.

19. The system as claim 17 recites, the action further comprising:
causing the one or more second instructions to be output via a user interface associated with an application executing on a device operated by at least one of a driver or a passenger of the parking vehicle.

20. The system as claim 17 recites, the action further comprising:
causing the one or more second instructions to be output via a user interface associated with an application executing on a computing system of the parking vehicle.

* * * * *